United States Patent
Jacob

(10) Patent No.: US 10,990,069 B1
(45) Date of Patent: *Apr. 27, 2021

(54) SYSTEMS AND METHODS FOR MONITORING BUILDING HEALTH

(71) Applicant: State Farm Mutual Automobile Insurance Company, Bloomington, IL (US)

(72) Inventor: Michael S. Jacob, Le Roy, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/744,578

(22) Filed: Jan. 16, 2020

Related U.S. Application Data

(63) Continuation of application No. 16/000,318, filed on Jun. 5, 2018, now Pat. No. 10,579,028, which is a (Continued)

(51) Int. Cl.

| | |
|---|---|
| *G05B 15/02* | (2006.01) |
| *E04B 1/98* | (2006.01) |
| *G06Q 40/08* | (2012.01) |
| *E04B 1/92* | (2006.01) |
| *G06N 5/04* | (2006.01) |
| *E04B 1/72* | (2006.01) |

(Continued)

(52) U.S. Cl.
CPC ............... *G05B 15/02* (2013.01); *E04B 1/64* (2013.01); *E04B 1/70* (2013.01); *E04B 1/72* (2013.01); *E04B 1/92* (2013.01); *E04B 1/98* (2013.01); *G06N 5/04* (2013.01); *G06Q 40/08* (2013.01)

(58) Field of Classification Search
CPC ............... G06Q 40/08; G06Q 30/0252; G06Q 30/0283; G06Q 50/163; G01N 25/72; G05B 15/02; E04B 1/98; E04B 1/70; E04B 1/92; E04B 1/64; E04B 1/72; G06N 5/04
USPC ........................................................ 700/275
See application file for complete search history.

(56) References Cited

U.S. PATENT DOCUMENTS

| | | |
|---|---|---|
| 4,110,945 A | 9/1978 | Sheahan |
| 4,297,686 A | 10/1981 | Tom |

(Continued)

*Primary Examiner* — Michael J Brown
(74) *Attorney, Agent, or Firm* — Armstrong Teasdale LLP

(57) ABSTRACT

A building monitoring computer system for monitoring building integrity may be provided. Various types of sensors may be embedded throughout or within certain portions of different types of building or construction material making up the building, such as within roofing, foundation, or structural materials. The sensors may be in wireless communication with a home controller. The sensors may be water, moisture, temperature, vibration, or other types of sensors, and may detect unexpected or abnormal conditions within the home. The sensors and/or home controller may transmit alerts to a mobile device of the home owner associated with the unexpected condition, and/or that remedial actions may be required to repair the home or mitigate further damage to the home. The sensor data may also be communicated to an insurance provider remote server to facilitate the insurance provider communicating insurance-related recommendations, updating insurance policies, or preparing insurance claims for review for home owners.

20 Claims, 19 Drawing Sheets

Related U.S. Application Data continuation of application No. 15/017,374, filed on Feb. 5, 2016, now Pat. No. 10,042,341.

(60) Provisional application No. 62/118,359, filed on Feb. 19, 2015, provisional application No. 62/203,743, filed on Aug. 11, 2015.

(51) Int. Cl.
  *E04B 1/64* (2006.01)
  *E04B 1/70* (2006.01)
  *G06Q 30/02* (2012.01)
  *G06Q 50/16* (2012.01)

(56) References Cited

U.S. PATENT DOCUMENTS

| | | | |
|---|---|---|---|
| 4,374,379 A | 2/1983 | Dennison, Jr. |
| 5,081,422 A | 1/1992 | Shih |
| 5,748,092 A | 5/1998 | Arsenault et al. |
| 6,106,769 A | 8/2000 | Shinya et al. |
| 6,147,613 A | 11/2000 | Doumit |
| 6,166,641 A | 12/2000 | Oguchi et al. |
| 6,167,666 B1 | 1/2001 | Kelly |
| 6,317,051 B1 | 11/2001 | Cohen |
| 6,786,091 B1 | 9/2004 | Aleali |
| 6,853,958 B1 | 2/2005 | Turin et al. |
| 6,955,676 B2 | 10/2005 | Quick |
| 7,124,772 B1 | 10/2006 | Browning |
| 7,142,123 B1 | 11/2006 | Kates |
| 7,239,246 B2 | 7/2007 | Picco et al. |
| 7,306,008 B2 | 12/2007 | Tornay |
| 7,334,938 B2 | 2/2008 | Remsburg |
| 7,561,057 B2 | 7/2009 | Kates |
| 7,768,412 B2 | 8/2010 | Vokey |
| 8,106,768 B2 | 1/2012 | Neumann |
| 8,106,769 B1 | 1/2012 | Maroney et al. |
| 8,319,626 B1 | 11/2012 | Cantolino |
| 8,384,538 B2 | 2/2013 | Breed |
| 8,844,835 B2 | 9/2014 | Ford |
| 8,874,454 B2 | 10/2014 | Plummer et al. |
| 8,922,379 B1 | 12/2014 | Meyer |
| 9,318,158 B2 | 4/2016 | Baker, Jr. et al. |
| 9,341,540 B2 | 5/2016 | Gunness |
| 9,383,289 B1 | 7/2016 | Meyer |
| 9,535,022 B1 | 1/2017 | Meredith et al. |
| 9,576,463 B2 | 2/2017 | Walbert et al. |
| 9,640,471 B2 | 5/2017 | Kinzer |
| 9,811,862 B1 | 11/2017 | Allen et al. |
| 9,818,158 B1 | 11/2017 | Devereaux et al. |
| 9,892,463 B1 | 2/2018 | Hakimi-Boushehri et al. |
| 9,947,051 B1 | 4/2018 | Allen et al. |
| 10,579,028 B1 * | 3/2020 | Jacob ............ E04D 13/006 |
| 2003/0066340 A1 | 4/2003 | Hassenflug |
| 2005/0002857 A1 | 1/2005 | Pez et al. |
| 2005/0162280 A1 | 7/2005 | Hayashida et al. |
| 2005/0174246 A1 | 8/2005 | Picco et al. |
| 2005/0192963 A1 | 9/2005 | Tschiegg et al. |
| 2005/0285748 A1 | 12/2005 | Pedraza et al. |
| 2006/0007008 A1 | 1/2006 | Kates |
| 2006/0192678 A1 | 8/2006 | Garabedian |
| 2008/0065427 A1 | 3/2008 | Helitzer et al. |
| 2008/0184272 A1 | 7/2008 | Brownewell |
| 2008/0282817 A1 | 11/2008 | Breed |
| 2009/0044595 A1 | 2/2009 | Vokey et al. |
| 2009/0153336 A1 | 6/2009 | Kates |
| 2009/0201123 A1 | 8/2009 | Kafry et al. |
| 2009/0235992 A1 | 9/2009 | Armstrong |
| 2009/0265193 A1 | 10/2009 | Collins et al. |
| 2010/0085198 A1 | 4/2010 | Boss et al. |
| 2011/0166714 A1 | 7/2011 | Stachnik |
| 2011/0194102 A1 | 8/2011 | Richardson et al. |
| 2012/0062384 A1 | 3/2012 | McDanal et al. |
| 2013/0032228 A1 | 2/2013 | Mao |
| 2014/0070941 A1 | 3/2014 | Morehead |
| 2014/0136242 A1 | 5/2014 | Weekes et al. |
| 2014/0257862 A1 | 9/2014 | Billman et al. |
| 2014/0270492 A1 | 9/2014 | Christopulos et al. |
| 2014/0358592 A1 | 12/2014 | Wedig et al. |
| 2015/0000380 A1 | 1/2015 | Cho et al. |
| 2015/0064022 A1 | 3/2015 | Cobo |
| 2015/0162006 A1 | 6/2015 | Kummer |
| 2015/0163412 A1 | 6/2015 | Holley et al. |
| 2015/0259923 A1 | 9/2015 | Sleeman |
| 2016/0002842 A1 | 1/2016 | Dawes et al. |
| 2016/0005130 A1 | 1/2016 | Devereaux et al. |
| 2016/0024759 A1 | 1/2016 | Vinjamaram |
| 2016/0042463 A1 | 2/2016 | Gillespie et al. |
| 2016/0104250 A1 | 4/2016 | Allen et al. |

* cited by examiner

SYSTEMS AND METHODS FOR MONITORING BUILDING HEALTH

CROSS-REFERENCE TO RELATED APPLICATIONS

The present application is a continuation of, and claims the benefit of, U.S. patent application Ser. No. 16/000,318, entitled "Systems and Methods for Monitoring Building Health" and filed Jun. 5, 2018, which is a continuation of, and claims the benefit of, U.S. patent application Ser. No. 15/017,374, entitled "Systems and Methods for Monitoring Building Health" and filed Feb. 5, 2016, which claims the benefit of priority of U.S. Provisional Patent Application Ser. No. 62/118,359, filed Feb. 19, 2015, and of U.S. Provisional Patent Application Ser. No. 62/203,743, filed Aug. 11, 2015, the contents of all of which are hereby incorporated by reference, in their entireties and for all purposes, herein.

FIELD OF THE DISCLOSURE

The present disclosure relates to maintaining a building and, more particularly, to systems and methods for monitoring the health of a building, such as a residential house.

BACKGROUND

Commercial and residential buildings are exposed to the elements during the course of their use. The effects of environmental conditions such as wind, heat and cold, solar rays, shifting earth, pests, and various forms of precipitation such as rain, sleet, snow, hail, and humidity all contribute to the deterioration of buildings over time. A building component or system such as the roofing shingles or the foundation of a residential home is installed to maintain integrity against certain environmental elements such as rain water or heat/cold. However, over the course of the component's installed life, exposure to various environmental conditions can cause the component to deteriorate and begin to fail.

For example, roofing shingles of a conventional residential home help keep rain water from getting into the home. However, a hail storm event, for example, may cause some shingles to break or otherwise compromise the integrity of the roofing system, leading to recurring water leaks in the attic or upper level(s) of the building. In many cases, these leaks may not be immediately evident, as some homeowners may not frequent their attics, or may not otherwise regularly inspect their home's systems. As such, these system integrity failures may go undetected for weeks, months, or years until evidence presents itself more apparently to the homeowner. This delay in promptly detecting such building system failures may lead to additional damage to the building. For example, one eventual visual indicator for an undetected roof leak may be a resulting dark spot or stain of dampness and/or mold growth on the ceiling of an interior roof where the leak dripped over the course of many rains.

This additional or ancillary damage created by the undetected compromise may cause building owners to have to spend significantly more to repair the building, as they pay to fix not only the underlying system failure (e.g., the leaky roof) but also the damage caused by not promptly detecting the failure (e.g., the mold growth in an attic and the staining on the interior ceiling). As such, early detection of faults or compromises in various building systems may be desirable.

BRIEF SUMMARY

The present embodiments may relate to systems and methods for earlier detection of failures or compromises in building system, potentially allowing building owners (e.g., homeowners) to remedy the failures before additional damage is done to the building. A building monitoring system may collect sensor data from one or more sensors positioned at failure detection points within or around the building. The sensors may be strategically placed throughout a home (such as in the foundation, attic, basement, roof, etc.) and may be embedded within the home's construction or building material, or a selected portion thereof. The building monitoring system may analyze the sensor data and/or provide information to the building owners, such as alerts and/or recommended remedial actions when a building system failure and/or insurance-related event (such as a leaking roof, crack in the foundation, water or other moisture (e.g., heating oil, natural gas, etc.) leak) is detected and/or expected from the sensor data analysis. The information collected may be used by an insurance provider, such as to determine recommended mitigating actions, prepare insurance claims, handle insurance claims, estimate repair costs, and/or generate or adjust insurance policies, premiums, rates, and/or discounts (such as for homeowners or renters insurance).

In one aspect, a building monitoring computer system for monitoring construction materials of a building may be provided. The system may include at least one moisture sensor positioned at a first position within the construction materials of the building and configured to provide a moisture level proximate to the at least one moisture sensor, the at least one moisture sensor being embedding within the construction materials of the building. The system may also include a memory including a moisture profile of the building, the moisture profile including a profile moisture level associated with the first position and one or more processors communicatively coupled to the at least one moisture sensor. The one or more processors may be programmed to receive a sample moisture level from the at least one moisture sensor via wireless communication, compare the sample moisture level to the profile moisture level to generate a moisture level difference, generate a moisture alert based upon determining that the moisture level difference exceeds a pre-determined threshold, and transmit a moisture alert message to a mobile device of a user of the building monitoring computer system via wireless communication to inform the user of the presence of moisture at the first position.

In another aspect, a computer-implemented method for monitoring construction materials of a building may be provided. The method may be implemented by a building monitoring computer system including one or more processors, a memory, and at least one moisture sensor positioned at a first position within the construction materials of the building and configured to provide a moisture level proximate to the at least one moisture sensor. The method may include identifying a moisture profile associated with the building in the memory, the moisture profile including a profile moisture level associated with the first position, receiving a sample moisture level from the moisture sensor via wireless communication, the moisture sensor being embedded within the construction materials of the building, comparing the sample moisture level to the profile moisture level to generate a moisture level difference, generating a moisture alert based upon determining that the moisture level difference exceeds a pre-determined threshold, and transmitting a moisture alert message to a mobile device of a user of the building monitoring computer system via wireless communication to inform the user of the presence of moisture at the first position.

In yet another aspect, a building monitoring computer system for monitoring a structural system of a building may be provided. The system may include at least one insect sensor positioned at a first position proximate a structural component of the structural system and configured to detect the presence of an insect infestation proximate to the first position, the at least one insect sensor being embedded in construction materials of the building and one or more processors communicatively coupled to the at least one insect sensor. The one or more processors may be programmed to receive a signal from the at least one insect sensor indicating the insect infestation via wireless communication, determine the first position within the construction materials of the building, generate an insect alert indicating the presence of an insect infestation at the first position, and transmit an insect alert message to a mobile device of a user of the building monitoring computer system via wireless communication to inform the user of the presence of insects at the first position.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 4b depicts a cross-section view of exterior wall that may be a part of the exemplary thermal system shown in FIG. 4a.

FIG. 4c depicts a cross-section view of exterior wall that also includes a window that is a part of the exemplary thermal system shown in FIG. 4a.

FIG. 4d depicts an exemplary foundation of a basement, including foundation walls and a foundation floor, and also including a "finished" wall (e.g., drywall and insulation) and a flooring layer (e.g., carpeting) that are also a part of the thermal system shown in FIG. 4a.

Figure 1:
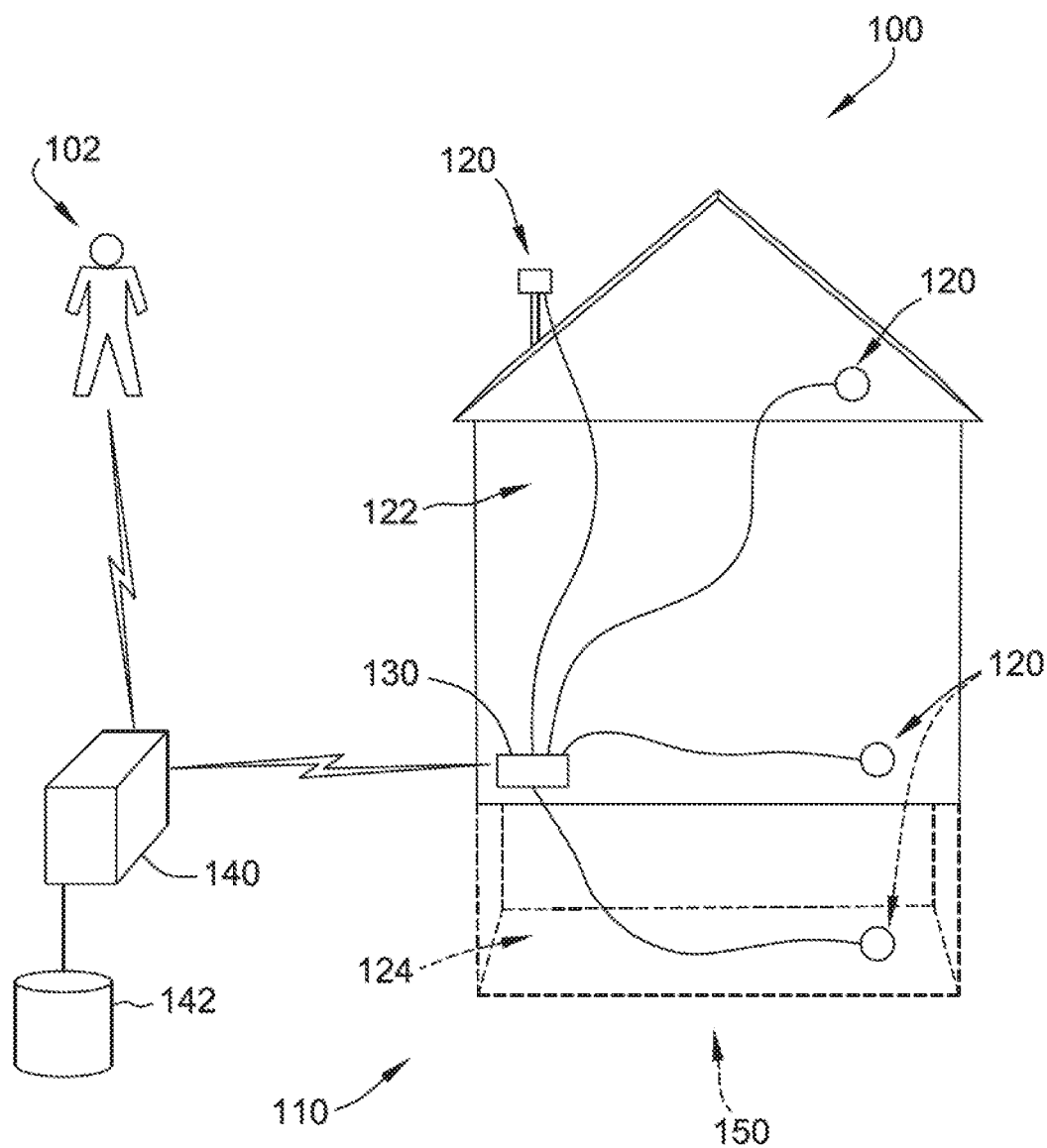
FIG. 1 depicts an exemplary building environment in which a building monitoring system monitors a building, such as a residential home of a building owner ("homeowner").

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

A system and method may include and/or employ an Ultra-Smart Home (e.g., a home with sensors embedded in construction or building materials throughout a home or building, or embedded in building materials in select areas of the home or building) in wired or wireless communication with a Home-Health Data Recorder (or smart home controller). Similar to a flight data recorder that monitors aircraft and pilot activities, the home data recorder (or "black box") may log and alert a homeowner of potential defects that may impact the integrity and longevity of the property.

For example, the monitoring system may be in wireless communication or data transmission with construction/material sensors strategically placed throughout the home (in foundation, attic, basement, roof, etc.). In one embodiment, the sensors may detect or discover a vapor barrier breach that may be allowing moisture to penetrate the construction material that, in turn, results in mold and, ultimately, the destruction of property. The system may proactively monitor the home's construction material for detects and report the potential defect(s) to the home owner so they may take corrective, preventive, and/or damage mitigating actions.

Generally, an ultra-smart proactive whole-house material monitoring system may be provided. The system may use strategically placed/embedded sensors to: (1) collect data on a home's past and present state; (2) alert a home owner of potential defect(s) or risk(s); (3) give advice on corrective measures; and/or (4) communicate with a remote server associated with an insurance provider providing insurance on the home, such that the insurance provider and/or insurance provider remote server may provide appropriate recommendations related to remedial actions, make adjustments to insurance policies or premiums, and/or handle insurance claims associated with insurance-related events more expeditiously. The strategically placing of material sensors (or sensors embedded within building or home construction materials) may facilitate the monitoring of the past and the current state of the home. The embedded sensors may monitor for, and/or detect, abnormal or unexpected conditions. As used herein, abnormal or unexpected conditions may include, but are not limited to, (i) a potential vapor barrier beach; (ii) cracks in the foundation; (iii) water leaks; (iv) abnormal temperature(s); (v) abnormal or unexpected moisture; and/or other abnormal conditions, including those discussed elsewhere herein. Additionally or alternatively, the embedded sensors may also compare and contrast past and current home health states.

Exemplary sensors placed about a home and/or embedded within building or construction materials (such embedded throughout construction materials and/or embedded within certain or limited amounts of construction materials that are used at a specific or strategic locations within the home—such as at corners of a roof or a foundation), are shown in the Figures and discussed further below. The sensors may be "smart sensors" and each may include one or more types of sensors (water, temperature, pressure, odor, moisture, etc.), processors, power units, batteries, clocks, GPS (Global Positioning System) units, memory units, instructions, clocks, actuators, transmitter, receivers, transceivers, other electronic components, miniature electronics and circuitry, etc. Each smart sensor may be configured for wireless RF (radio frequency) communication and/or data transmission to other devices, such as mobile devices, smart home controllers, and/or remote servers, such as remote servers associated with insurance providers.

More specifically, systems and methods are described herein for maintaining a building and monitoring the health of the building, such as a residential house. In one embodiment, a building monitoring system may be provided. The building monitoring system may receive sensor data from various building sensors positioned (and/or embedded within construction material) at installation points within or around the building. The building sensors provide data that may be used to analyze the integrity of a building's systems such as, for example, the roofing system, the thermal system (e.g., insulation, heating, air conditioning), the structural/facial system (e.g., wooden components supporting the building or providing an exterior surface of the building), and/or the foundation system (e.g., concrete foundation, sump pump). The monitoring system may collect and analyze the sensor data and, upon detection of a system compromise or failure, generate a message and/or an alert indicating the nature of the compromise.

At least one of the technical problems addressed by this system may include: (i) inability to detect building system failures before additional or ancillary damage is caused by the failure; (ii) difficulty detecting system failures at certain locations due to, for example, inaccessibility to visual inspection or infrequency of visual inspection; (iii) difficulty detecting certain types of system failures such as, for example, deterioration of insulation performance over long periods of time; (iv) difficulty correlating data from multiple sources and/or comparing historical data to determine system failures that are not otherwise apparent from data from a single source, or at a single time; and/or (v) difficulty tracking historical records of a building's health and improvements made to the building over time.

The technical effects of the systems and processes described herein may be achieved by performing at least one of the following steps: (a) receiving a signal from the at least one water sensor indicating the presence of water; (b) determining the first position within the roof of the building; (c) generating a water alert indicating the presence of water at the first position; and/or (d) transmitting a water alert message to a user of the building monitoring computer system. The technical effect may be achieved by (e) identifying a thermal profile of the building, the thermal profile including a plurality of profile elements, each profile element including a profile internal temperature, at least one profile external temperature, and/or a profile utility run time associated with one of a furnace and an air conditioning device associated with the building; (f) receiving a plurality of temperature samples from the at least one external thermal sensor during a sample time period; (g) determining one of a minimum external temperature and a maximum external temperature for the external environment during the sample time period; (h) determining a sample utility run time associated with the one of the furnace and the air conditioning device during the sample time period; (i) determining a sample internal temperature during the sample time period; (j) identifying the corresponding profile element from the thermal profile based at least in part on the sample internal temperature, and one of the minimum external temperature and the maximum external temperature; (k) comparing the sample utility run time to the identified profile utility run time to generate a utility run time difference; (l) determining that the utility run time difference exceeds a pre-determined threshold; (m) generating a thermal alert based upon determining that the run time difference exceeds the pre-determined threshold; and/or (n) transmitting a thermal alert message to a user of the building monitoring computer system. The technical effect may be achieved by (o) identifying a moisture profile of the building, the moisture profile including a profile moisture level associated with the first position; (p) receiving a sample moisture level from the moisture sensor; (q) comparing the sample moisture level to the profile moisture level to generate a moisture level difference; (r) generating a moisture alert based upon determining that the moisture level difference exceeds a pre-determined threshold; and/or (s) transmitting a moisture alert message to a user of the building monitoring computer system.

The technical effect may further be achieved by (t) receiving a signal from the at least one insect sensor indicating the insect infestation; (u) determining the first position within the structure of the building; (v) generating an insect alert indicating the presence of an insect infestation at the first position; and/or (w) transmitting an insect alert message to a user of the building monitoring computer system. Additionally or alternatively, the technical effect may be achieved by (x) identifying a vibration profile of the building, the vibration profile including a maximum profile vibration level at a first position proximate a structural component of the structural system, wherein the maximum profile vibration level represents a level of vibration likely to cause damage to the structural component proximate to the first position; (y) receiving a signal from the at least one vibration sensor including a sample vibration level proximate to the first position; (z) comparing the sample vibration level to the maximum profile vibration level; (aa) determining that the sample vibration level exceeds the maximum profile vibration level; (bb) generating a vibration alert indicating that the structural component near the first position has experienced a potentially damaging vibration level; and/or (cc) transmit a vibration alert message to a user of the building monitoring computer system.

The technical effect achieved by this system may be at least one of: (i) early detection of building system failures; (ii) detecting system failures at less accessible or less frequented locations; (iii) detecting various types of system failures; (iv) correlating data from various sensor data sources and sensor types to determine system failures and/or building system health status; and/or (v) creating and storing a historical record of a building's health and improvements made to the building over time. Other technical effects may include the intersection of wireless communication (such as between sensors, smart home controllers, and/or insurance provider remote servers) and insurance-related activities (such as generating recommendations that alleviate potential damage or mitigate existing home damage, and/or update insurance policies, premiums, discounts, and/or rates based upon a more accurate and up-to-date picture of insurance-related risk, or lack of risk, due to structural deterioration, or lack thereof, to a home or other dwelling).

I. Exemplary System for Monitoring Building Health

FIG. 1 depicts an exemplary building environment 100 in which a building monitoring system 110 monitors a building 150, such as a residential home of a building owner ("homeowner") 102. In the exemplary embodiment, building monitoring system 110 may include a sensor data collection device 130, a monitoring server 140 (e.g., remote from or local to building 150 premises) including a database 142, and/or a plurality of sensors 120 deployed (and/or embedded) throughout building 150. Each sensor 120 may provide sensor data to sensor data collection device 130 within building 150. Sensor data collection device 130 may be in communication with monitoring server 140, which may perform various data analysis and storage, and may include a user interface that allows homeowner 102 to see data and analytics about the health of building 150.

In the exemplary embodiment, sensors 120 may be in wired communication with sensor data collection device 130. In other embodiments, some sensors 120 may be in wireless communication with sensor data collection device 130 (e.g., via an IEEE 802.11 wireless local area network). In still other embodiments, sensor data may be stored local to sensor 120 and transferred or collected from sensor 120 and transferred to sensor data collection device 130 and/or monitoring server 140. Further, in the example embodiment, some sensors 120 may be locally powered (e.g., battery, direct-attached solar array), other sensors 120 may be powered via connection to a power distribution network (e.g., 120 Volt Alternating Current network of building 150), and still other sensors 120 may not require power or otherwise self-powered.

During operation, output values from sensors 120 are received by sensor data collection device 130 and transmitted to monitoring server 140 for storage in database 142 and for analytics and further processing, as described below.

In the exemplary embodiment, building monitoring system 110 may be configured to monitor one or more "building systems" associated with building 150. As used herein, the term "building system" is used to refer to one or more components of a building, such as building 150, that contribute to providing one or more functions provided by or associated with the building. For example, a "roofing system" (not separately identified) of a conventional residential home, such as building 150, may include components such as roofing shingles, underlayment, and deck surface boards resting atop a plurality of angled roofing frames or rafters. It should be understood that the components of the roofing system described here are examples, and that other additional or different components of roofing systems are possible and within the scope of this disclosure.

Each component of the building system can be described as providing or assisting in providing one or more "functions" of the building system. For example, the components of the roofing system described above, together or individually, provide at least the function of protecting the interior of the building from one or more of the elements such as, for example, rain, sleet, snow, and hail. More specifically, the roofing shingles assist in directing most rain water off of the roof (e.g., based upon their impermeability to water, and the particular way in which they are arranged on the roof), the underlayment may help direct any additional rain water off of the roof that was not channeled by the shingle, the deck surface boards provide an attachment surface onto which the shingles and underlayment may be connected to the roof, and the angled roofing frames provide an angled surface onto which the deck surface boards may be attached, and provide an angle such that, for example, rain water may be directed to flow off of the building. It should be understood that the function of the roofing system described here is an example, and that other additional or different functions of roofing systems are possible and within the scope of this disclosure.

In the exemplary embodiment, building monitoring system 110 may be configured to monitor for failure of, or other compromise of, one or more functions associated with one or more "building systems." For example, a failure or compromise of the roofing system may mean that water has been allowed to leak through the shingles and underlayment, and perhaps through the deck surface boards and into the interior of building 150. Such a failure of the roofing system may lead to, for example, water or mold damage to the deck surface board(s) and/or to other interior components of building 150.

In the exemplary embodiment, sensors 120 provide data that may be used to evaluate the health or integrity of one or more building systems associated with building 150, such as a roofing system (e.g., as described above), a "thermal system" (e.g., temperature control of an interior 122 of building 150), a foundation system (e.g., below-ground walls and floor of a basement 124), and/or a structural system (e.g., structural support members for supporting the skeletal structure and contents of building 150). The monitoring of the roofing system is described in greater detail below in reference to FIGS. 2-3. The monitoring of the thermal system is described in greater detail below in reference to FIGS. 4a-4d. The monitoring of the foundation system is described in greater detail below in reference to FIG. 5. The monitoring of the structural system is described in greater detail below in reference to FIG. 6.

II. Exemplary Roofing System and Sensors

Figure 2:
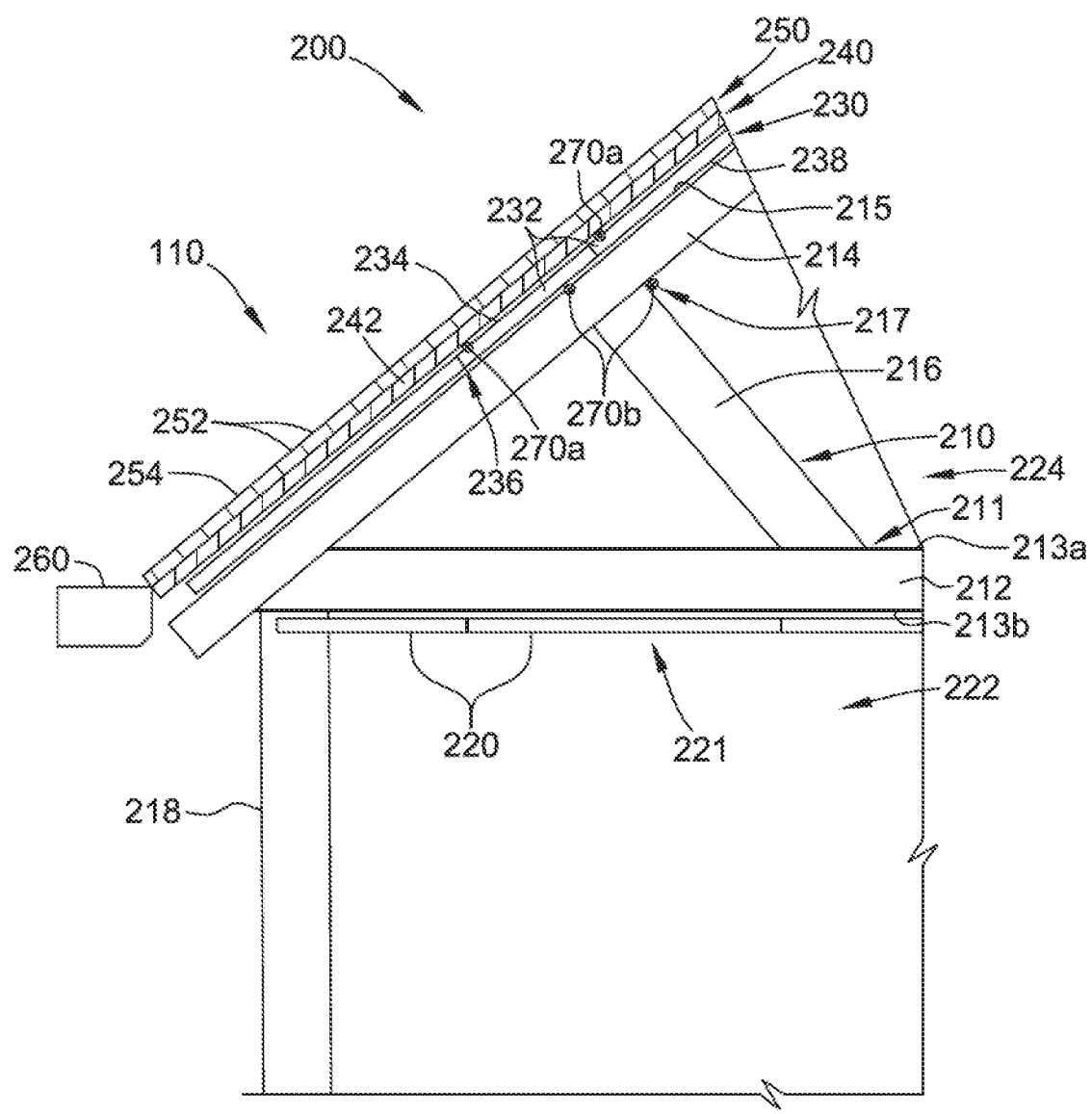
FIG. 2 depicts components of an exemplary roofing system, and associated sensors, that may be monitored by building monitoring system shown in FIG. 1.

FIG. 2 depicts components of an exemplary roofing system 200, and associated water sensors 270a, 270b (collectively 270) that may be monitored by building monitoring system 110 (shown in FIG. 1). In the exemplary embodiment, roofing system 200 may include components associated with a "gable" style roof for a residential home such as building 150 (shown in FIG. 1), but other roofing styles are within the scope of this disclosure. FIG. 2 illustrates a profile view of a roof of building 150. Roofing system 200 may include a plurality of wooden truss or roofing frames 210 covering a top of building 150, only one of which is shown in FIG. 2 for ease of illustration. Frames 210 may include one or more horizontal members ("ceiling joist" or "bottom chords") 212, one or more angled members ("rafters" or "top chords") 214, and one or more support members ("truss webs") 216. Such frame members 212, 214, 216 may be constructed from, for example, 2" (inch) wide by 10" high wood (i.e., "2×10's") of particular lengths, but other dimensioned components are possible. Frames 210 may be separated from each other by a distance such as 16 to 48 inches apart.

In the exemplary embodiment, frames 210 may be supported by at least one vertical wall 218 of building 150 which, in the exemplary embodiment, is an exterior wall of building 150. Drywall 220 may be installed on a ceiling 221 of an interior room 222 by, for example, screwing sections of drywall 220 to joists 212. Drywall 220 serves to isolate interior 222 of building 150 from an attic space 224 defined primarily by frames 210. In some embodiments, insulation (not shown) may be installed in attic 224 (e.g., between joists 212).

Roofing system 200, in the exemplary embodiment, may include a surface board layer 230 (also referred to as "based board layer"), an underlayment layer 240, and/or a shingle layer 250. Surface board layer 230 may include a plurality of surface boards 232 (also referred to as "base boards") comprising ¾" thick section of plywood. Each surface board 232 may be coupled to rafters 214 to form a flat surface onto which underlayment 240 and shingle layer 250 are installed. Underlayment layer 240 may comprise a sheet or sheets of underlayment 242 coupled to surface board layer 230. Shingle layer 250 may include a plurality of shingles 252 coupled to underlayment layer 240 and surface board layer 230, and/or arranged in a pattern such that, during proper functional operation, rain water and other precipitation runs substantially down an exterior surface 254 of shingle layer 250 and off of building 150 (e.g., into a gutter system 260). As such, roofing system 200 may perform at least the function of preventing precipitation water, such as rain from entering building 150 (e.g., attic 224 and/or interior 222).

In the exemplary embodiment, roofing system 200 may also include a plurality of water sensors 270. In some embodiments, water sensors 270 are similar to sensors 120 (shown in FIG. 1). More specifically, sensors 270a are positioned just beneath or interior to the outer-most layer at which water should not reach (e.g., where damage may start to be done). In the exemplary embodiment, underlayment layer 240 may represent a secondary water proofing layer (i.e., for any water that seeps through cracks in or gaps between shingles 252), and sensors 270a may be positioned interior to or below underlayment layer 240 (e.g., between underlayment layer 240 and base board layer 230). In the exemplary embodiment, sensors 270a may be coupled to an outer surface 234 of base board 232 just above an edge partition 236 between two base boards 232. In some embodiments, sensors 270a may be positioned within edge partition 236 (e.g., between two base boards 232). In other embodiments, sensors 270a may be coupled to an interior side 238 of base boards 232.

In the exemplary embodiment, one or more sensors 270b may be positioned on components of frames 210. In some embodiments, sensors 270b may be positioned on an exterior surface 215 of rafters 214 at one or more positions along its length. In some embodiments, sensors 270b may be positioned at an intersection between components of frames 210, such as intersection 217, where rafter 214 meets truss web 216, and/or along an edge of truss web 216. In some embodiments, sensors 270b may be positioned along joist 212, such as along a top edge 213a, a bottom edge 213b (e.g., between joist 212 and ceiling drywall 220, or at an intersection 211 between truss web 216 and joist 212).

During operation, sensors 270a may signal the presence of water (e.g., a water leak in roofing system 200) whenever a leak flow or drip connects with a sensor 270a. Sensors 270a may be communicatively coupled to building monitoring system 110, which analyzes the leak data and signals the water alert indicated by the particular sensor. The alert may be sent to a mobile device of homeowner 102, who may then investigate the leak for prompt attention before additional damage is incurred. In some embodiments, positions of individual sensors 270a are known, and a signal from a particular sensor (also referred to herein as "sensor data") may be distinguished from other sensors. As such, building monitoring system 110 may also indicate the position of one or more sensors that have been triggered by the presence of the leaking water, giving homeowner 102 a physical indication of where to look for the leak.

Figure 3:
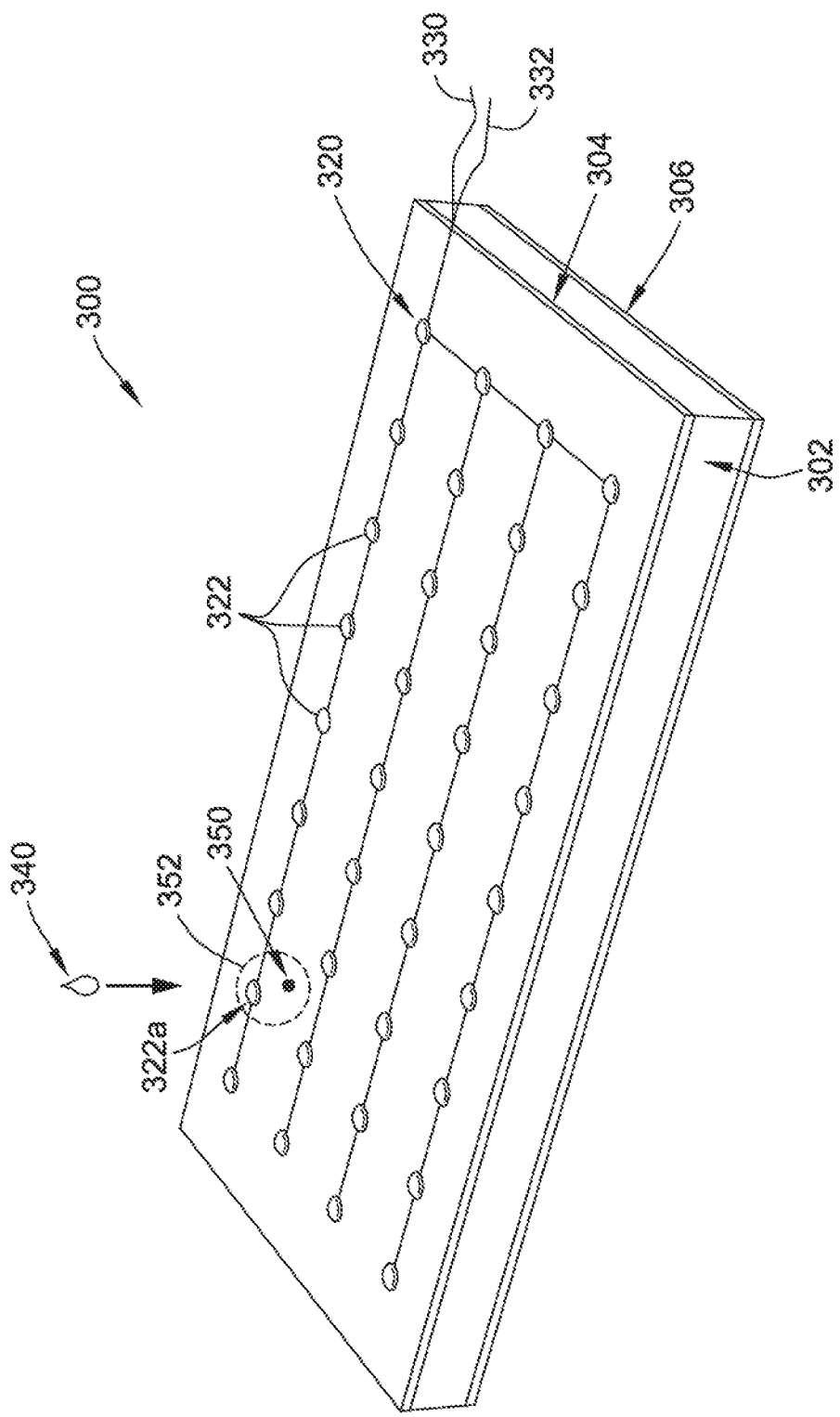
FIG. 3 depicts an exemplary sheet of drywall having an array of water sensors that may be used as ceiling drywall in the example roofing system shown in FIG. 2.

FIG. 3 depicts an exemplary sheet of drywall 300 having an array of water sensors 320 that may be used as ceiling drywall 220 in the exemplary roofing system 200 (shown in FIG. 2). In some embodiments, drywall 300 may be similar to ceiling drywall 220 (shown in FIG. 2), and sensors 320 may be similar to sensors 270 and/or sensors 120. Known drywall is sometimes referred to as "Sheetrock®," "gypsum board," or "wallboard" in the construction trade.

In the exemplary embodiment, drywall 300 may include a layer 302 of gypsum plaster or other similar material between two outer layers 304 and 306 of paper that form a smooth surface which may be painted or otherwise finished, and serves to contain the gypsum plaster within. In the exemplary embodiment, drywall 300 may be 4' wide by 8' long by ¾" thick, but other dimensions are possible. In FIG. 3, the thicknesses of drywall 300, and layers 302, 304, 306 are shown exaggerated (i.e., not to scale) for purposes of illustration.

In the exemplary embodiment, array of water sensors 320 may include a plurality of water sensors 322 coupled together for both power and data signal communication. Sensors 322 may be positioned in a planar matrix configuration and spaced approximately 10" apart from adjacent neighbors, both latitudinally and longitudinally. In some embodiments, sensors 322 may be spaced as little as 6" apart or as much as 16" apart. Array 320, in the example embodiment, may be installed between layer 304 and layer 302 (i.e., between the outer layer paper surface and the interior gypsum). In other embodiments, array 320 may be installed on an exterior surface of drywall 300 (e.g., on an exterior surface of layer 304).

During installation, drywall 300 may be installed as a part of an interior ceiling 221 of building 150 (shown in FIG. 2). More specifically, in the exemplary embodiment, drywall 300 may be installed such that layer 304 and array of water sensors 320 is facing upward (e.g., facing attic space 224), making layer 306 face interior room 222.

During operation, such as during a rain water leak condition in roofing system 200 (shown in FIG. 2), water 340 penetrates into attic 224 and drips or flows down onto drywall 300 (e.g., a level surface) at an initial point of contact 350. As additional water flows, the water begins to both penetrate drywall 300 (e.g., layer 304 and layer 302), and water also begins to spread (e.g., radially out from point of contact). As the water spreads, a perimeter 352 of spreading water is formed and expands. In other words, the interior of perimeter 352 includes leaking water that has been absorbed by layer 304 and/or between layer 304 and layer 306 within that area. When perimeter 352 expands broadly enough to encounter or encompass a water sensor 322a, the water sensor signals contact with water, and this signal is transmitted to building monitoring system 110 (shown in FIG. 1).

III. Exemplary Thermal System and Sensors

Figure 4A:
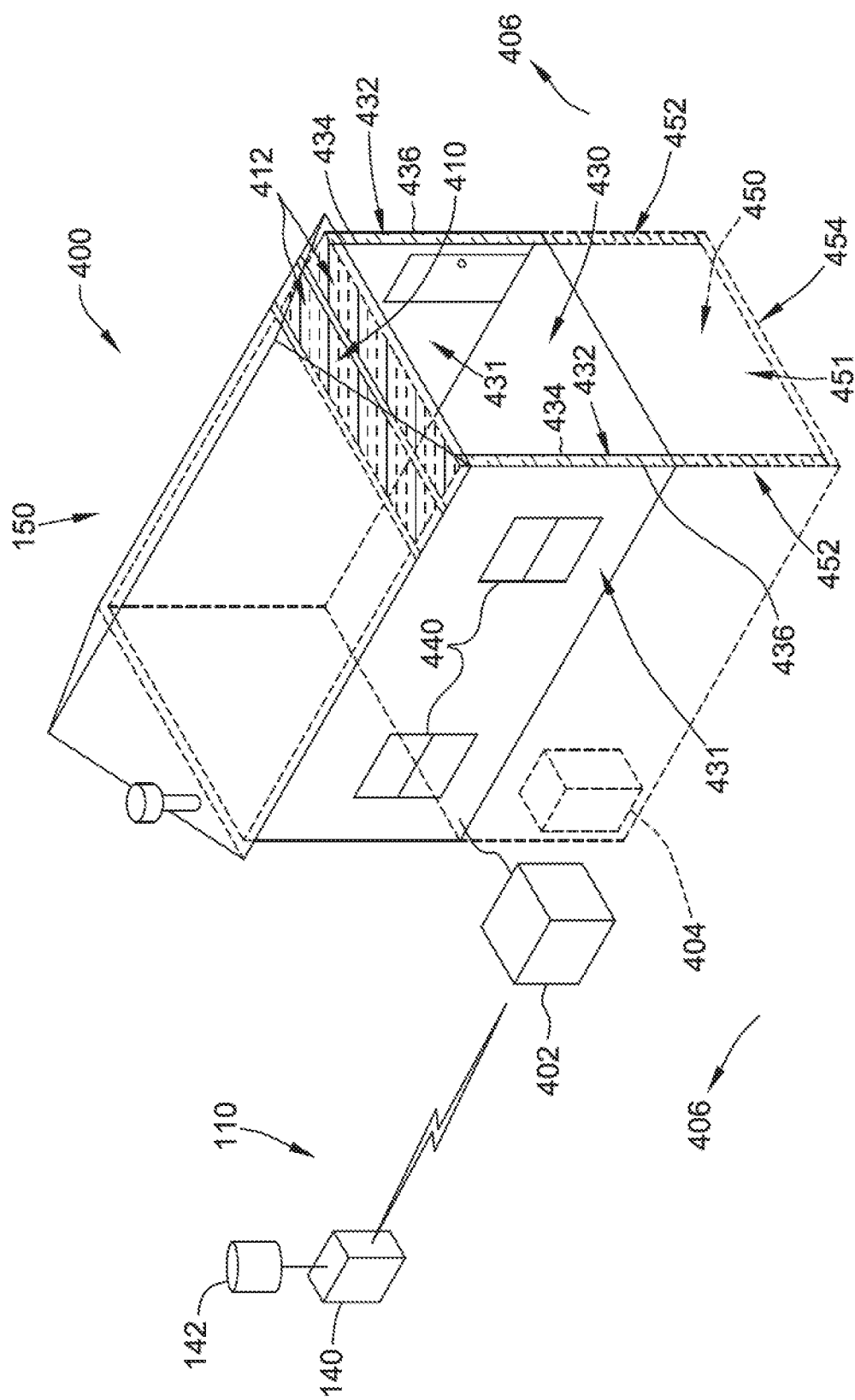
FIG. 4a depicts components of an exemplary thermal system and associated sensors, such as the sensors shown in FIG. 1, that may be monitored by the building monitoring system shown in FIG. 1.

FIG. 4a depicts components of an exemplary thermal system 400 that may be monitored by building monitoring system 110 (shown in FIG. 1). In the exemplary embodiment, thermal system 400 may include components associated with a residential house, such as building 150 (shown in FIGS. 1 and 2), but other building types and styles are within the scope of this disclosure. FIG. 4a illustrates a cross-section view of the house, which may include an attic space 410, a main floor interior 430 which may include a plurality of rooms (not separately identified), and/or a basement region 450. Thermal system 400 may include components that are configured to perform thermal control of the house. In other words, thermal system 400 may allow a homeowner 102 (shown in FIG. 1) to influence the internal temperature of the house, particularly relative to a surrounding external environment 406.

In the exemplary embodiment, thermal system 400 may include a cooling unit 402, such as an air conditioner, that is configured to generate cool air in the interior of the house, as well as a heating unit 404, such as a furnace, that is configured to generate warm air in the interior of the house. Each of air conditioner 402 and furnace 404 may be controlled by a thermostat device (not shown). The thermostat device may be configured to, among other functions, start and stop both air conditioner 402 and furnace 404. Homeowner 102 may configure the thermostat device with a target interior temperature (e.g., for interior space 430), and the thermostat device may automatically cause air conditioner 402 and/or furnace 404 to activate and deactivate in order to cause the interior temperature to reach the target temperature.

Thermal system 400, in the exemplary embodiment, also may include attic space 410 which may influence the thermal properties of the interior of the house. More specifically, attic space 410 may be defined by a gable roof similar to roofing system 200 (shown in FIG. 2). Attic space 410 may include insulation 412 positioned between joists 212. Insulation 412 may be configured to inhibit thermal transfer between two zones or areas. For example, insulation 412 may inhibit heat from transferring either from attic space 410 to interior space 430, or vice versa. Insulation 412 may define an "R-value" that quantifies the effectiveness of thermal transfer through the insulation (e.g., insulation 412), and may be based upon, for example, the thickness of the insulation and/or the material composure of the insulation.

In some embodiments, components of roofing system 200 may also be considered a part of thermal system 400, as they may influence the interior thermal temperature within the house. For example, some roofing shingles (e.g., a lighter-colored shingle) may be configured to reflect more solar rays as compared to other roofing shingle (e.g., a darker-colored shingle). As such, a lighter colored shingle may help keep the temperature of attic space 410 lower than a darker colored shingle, which may in turn help keep the interior temperature of interior space 430 lower as well.

During warmer periods (e.g., when the external temperature of the surrounding environment 406 exceeds the interior temperature of interior 430), attic space 410 may become warmed. Insulation 412 contributes in reducing the rate of heat transfer from a "hot" attic 410 to a cool interior 430, thereby reducing the amount of work or energy needed from air conditioner 402 to maintain a fixed interior temperature. In colder periods, attic space 410 may become cooled. Similarly, insulation 412 contributes in reducing the escape of heat from the "hot" interior 430 into attic space 410. As such, the more effectively insulation 412 performs in limiting the flow of heat between attic space 410 and interior 430, the less amount of time and energy will be needed from air conditioner 402 and/or furnace 404 to maintain homeowner's 102 target temperature.

In the exemplary embodiment, thermal system 400 may also include insulated walls 431 (also referred to as "exterior walls") separating interior 430 from the external environment 406. Insulated walls 431 may include an exterior layer 436 (e.g., made of brick and/or wood paneling), an interior layer 434 (e.g., made of wallboard and/or wood paneling). Between exterior layer 436 and interior layer 434 is an insulating layer 432. Insulating layer 432 may be similar to insulation 412 and/or may include other insulation material such as an insulating board. The insulating effects of exterior walls 431 perform restriction of heat transfer functions much as described above with respect to insulation 412. In other words, exterior walls 431 may inhibit heat transfer between interior 430 and the external environment 406 (rather than attic space 410) and, thus, may provide similar benefits to reducing time and energy heating or cooling interior 430 based upon their effectiveness. Additional embodiments with respect to exterior walls 431 are described in detail below with respect to FIG. 4b.

Thermal system 400, in the exemplary embodiment, may also include one or more window regions 440. Each window region 440 may present an aperture through exterior wall 431 (or, in some embodiments, a foundation wall 452 of basement 450). In other words, window region 440 may represent a region not covered by exterior layer 436, interior layer 434, and insulation layer 432. Window region 440, instead, may include a window structure (not separately shown in FIG. 4a) through which light may pass, such as one or more glass panes supported by window frames.

Window regions 440 often represent thermally-vulnerable regions on the exterior of a home (e.g., relative to regions covered by insulation 432). For example, in some embodiments, heat may enter or escape from interior 430 through window regions 440 more easily than through insulation-protected regions of exterior wall 431. Further, it is well known in the art that different types of windows (e.g., multi-paned glass, or insulated plastic framing components) may inhibit heat transfer more than others (e.g., single-paned glass, or aluminum framing components). Additional embodiments with respect to window regions 440 are described in detail below with respect to FIG. 4*c*.

In the exemplary embodiment, thermal system 400 may also include one or more foundation walls 452 and a foundation floor 454 (collectively referred to as the foundation). In the exemplary embodiment, foundation walls 452 and foundation floor 454 may be formed from poured concrete to form a basement region 450 of house 150. Some, or all, of the exterior of the foundation may be surrounded by soil, rock, and/or other earthen materials. In other words, some or all of the foundation may be below-ground such that the external environment 406 adjacent to the foundation is the neighboring ground itself. The foundation represents a thermal barrier through which heat may pass (e.g., from basement 450 to/from environment 406). Additional embodiments with respect to the foundation are described in detail below with respect to FIG. 4*d*.

Figure 4B:
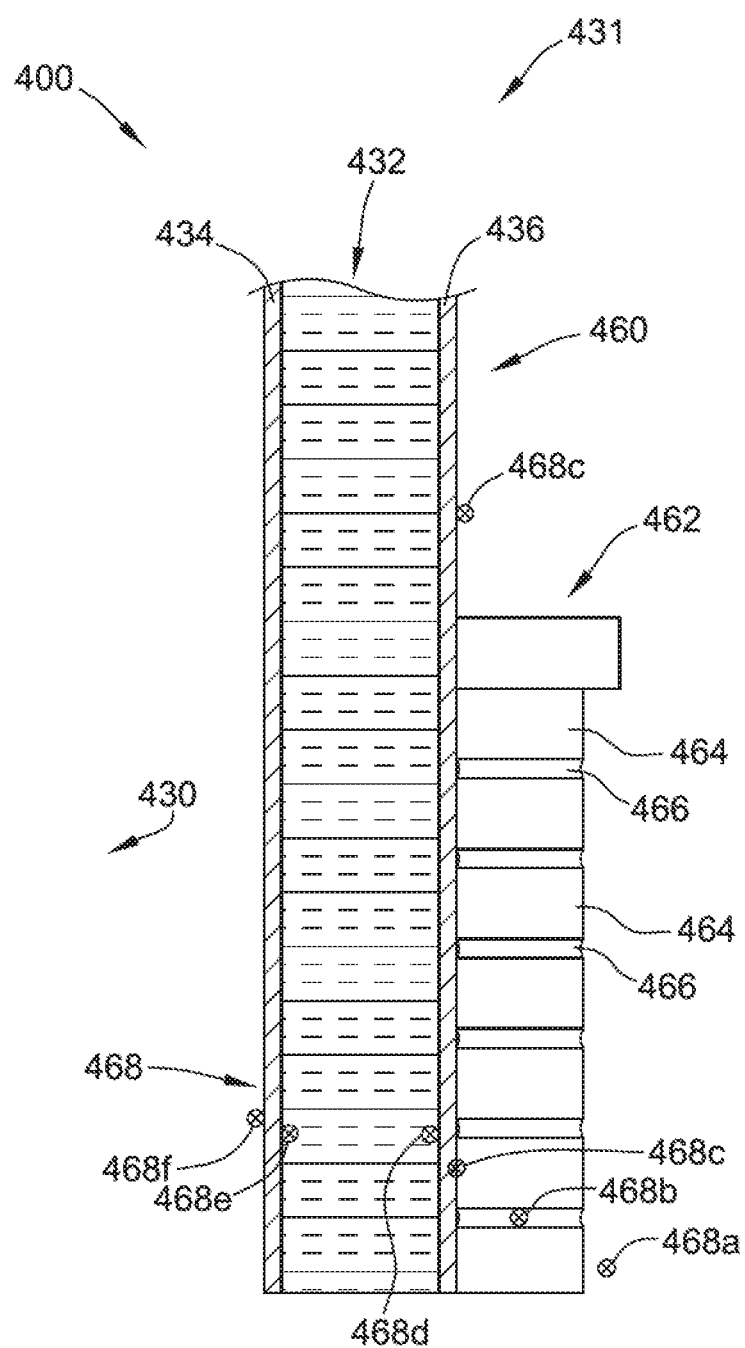

FIG. 4*b* depicts an exemplary cross-section view of exterior wall 431 that may be a part of thermal system 400 (shown in FIG. 4*a*). In the exemplary embodiment, thermal system 400 may include exterior wall 431, as described above. Several components of exterior wall 431 may contribute to heat transfer or propagation between external environment 406 and interior 430, and thus thermal system 400. For example, in some embodiments, exterior wall 431 may include an exterior layer 460 and an interior layer 434 bordering an insulation layer 432. In some embodiments, exterior layer 460 may include sheets of wood 436 or other surface material, such as siding along some or all of exterior layer 460 of exterior wall 431.

In some embodiments, exterior layer 460 may include a brick wall 462 constructed from, e.g., brick 464 and mortar 466, along some or all of exterior layer 460 of an exterior wall. Insulation layer 432 may be configured to inhibit thermal transfer, and may be configured based upon composition of material, form or structure of material, and/or functional mode (e.g., conductive, radiative, convective). Different types of materials and configurations of exterior wall 431 may exhibit different thermal inhibition properties (e.g., based upon the individual components and/or their configurations, individually and/or together).

In the exemplary embodiment, building monitoring system 110 (shown in FIG. 1) may include exterior wall sensors 468*a*, 468*b*, 468*c*, 468*d*, 468*e*, and/or 468*f* (collectively 468). In some embodiments, sensors 468 may be similar to sensors 120 (shown in FIG. 1). Sensors 468 may be configured to measure temperature at the point of installation and/or transmit temperature data to, for example, server 140 (shown in FIGS. 1 and 4) and/or sensor data collection device 130. In some embodiments, sensors 468 may include one or more exterior sensors 468*a* configured to collect temperature data associated with the ambient external environment 406 proximate exterior layer 460 of exterior wall 431. In some embodiments, sensors 468 may include one or more brick-layer sensors 468*b*. Brick-layer sensors 468*b* may be embedded within brick 464 (e.g., baked into brick 464 during creation, or within a cavity of brick 464) and/or mortar 466 (e.g., during construction of brick wall 462). Brick-layer sensors 468*b* may be configured to collect temperature data within brick wall 462). In some embodiments, sensors 468 may also include one or more exterior face sensors 468*c* attached to the outside of exterior layer 460. In some embodiments, exterior face sensors 468*c* may be positioned between exterior layer 436 and brick wall 462 (e.g., providing temperature data at the point between brick wall 462 and exterior layer 436). In other embodiments, exterior face sensor 468*c* may act as exterior sensor 468*a*.

In the exemplary embodiment, sensors 468 may include one or more exterior inner sensors 468*d* coupled to exterior layer 436, but within exterior wall 431 (e.g., within insulation layer 432 or between insulation layer 432 and exterior layer 436). Further, sensors 468 may also include one or more interior inner sensors 468*e* coupled to interior layer 434, but within exterior wall 431 (e.g., within insulation layer 432 or between insulation layer 432 and interior layer 434). Exterior inner sensors 468*d* may be configured to provide temperature data at points on respective sides of insulation layer 432. Sensors 468 may also include one or more interior sensors 468*f*. In some embodiments, interior sensors 468*f* may be coupled to the interior 430 facing surface of interior layer 434 (e.g., within interior 430).

In some embodiments, sensors 4 may be placed at varying heights along exterior wall 431, or at multiple horizontal positions along exterior wall 431. Some areas of exterior wall 431 may, for example, exhibit differing thermal transfer properties. As such, data from differing regions of exterior wall 431 may be analyzed to determine relatively-weaker or stronger insulated areas.

In the exemplary embodiment, building monitoring system 110 may collect profile data associated with one or more exterior walls 431 from associated sensors 468. For example, building monitoring system 110 may collect profile thermal data from sensors 468 at a particular point in time or period of time, as well as an external temperature and/or internal temperature at the time of collection. Building monitoring system 110 may store this thermal data as a profile element associated with a particular exterior wall.

In some embodiments, profile thermal data may be pre-designated or provided by a user such as homeowner 102. In other embodiments, profile thermal data may be identified over time and "learned" by building monitoring system 110. For example, building monitoring system 110 may identify a plurality of prior-collected profile elements matching or nearly matching a particular scenario, such as an interior temperature of 72° F. and an external temperature of 40° F. From these similar profile elements, building monitoring system 110 may identify a profile runtime for a utility device, such as furnace 404 by, for example, averaging the runtimes from the similar profile elements, and/or selecting the maximum, minimum, mean, or mode runtime from the similar profile elements. As such, building monitoring system 110 may automatically build a profile element for a given scenario. Building monitoring system 110 may similarly build profile elements for a variety of scenarios.

Later, in the exemplary embodiment, building monitoring system 110 may collect sample data (e.g., from sensors 468) at a sample time or time period. Building monitoring system 110 may identify a profile element from a plurality of profile elements associated with the particular external wall that most closely matches the sample data (e.g., based upon external temperatures). Building monitoring system 110 may compare the sample data to the identified profile element.

Figure 4C:
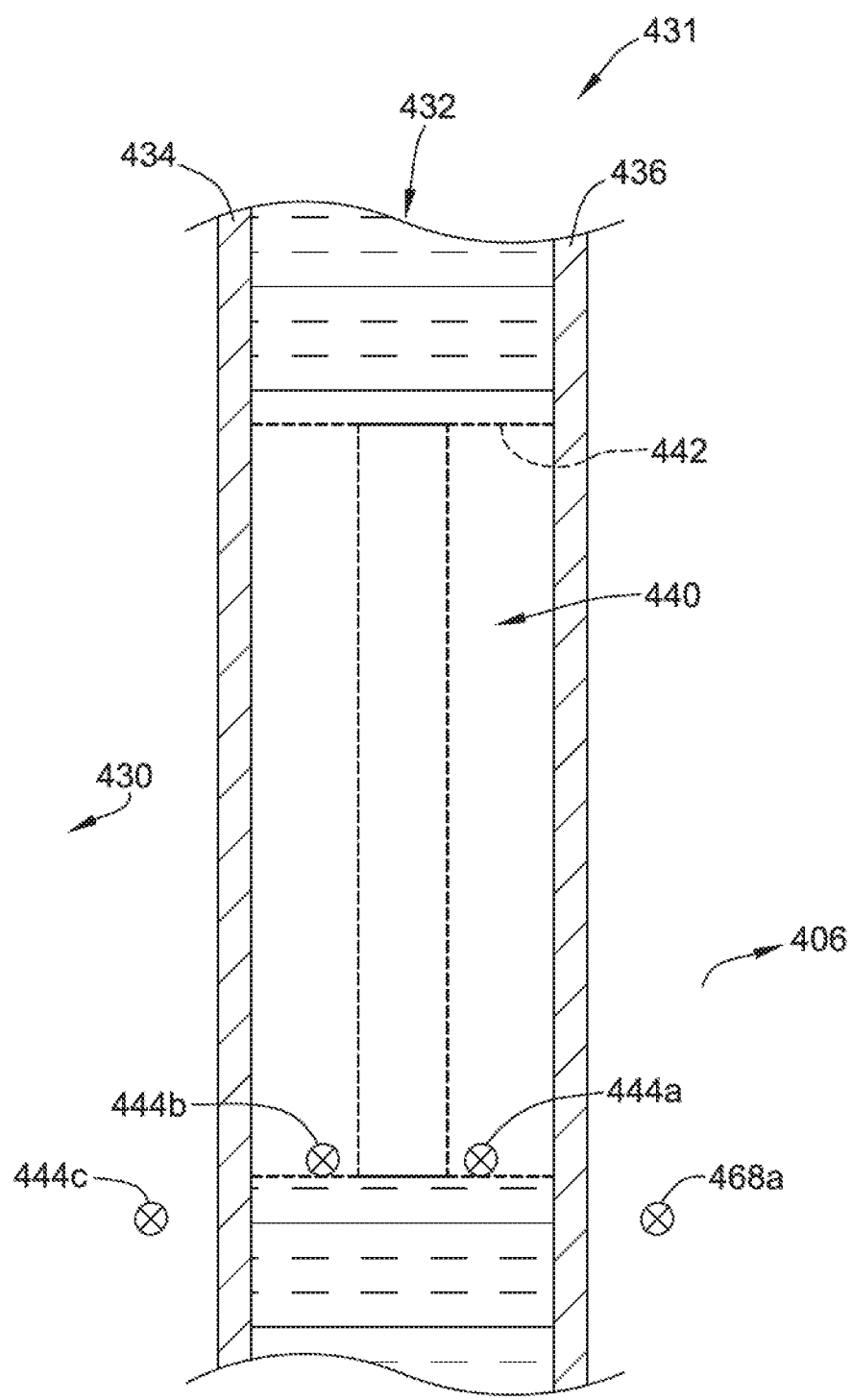

FIG. 4*c* depicts an exemplary cross-section view of exterior wall 431 that may also include a window 440 (also shown in FIG. 4) that is a part of the thermal system shown in FIG. 4*a*. In many known buildings, windows represent vulnerable areas for a thermal system, such as thermal system 400. In other words, windows are generally less effective at reducing thermal transfer between, for example, external environment 406 and interior 430, as compared to, for example, insulation layer 432. In some embodiments, windows 440 may be single- or multi-pane glass or other material that may let at least some light pass through the material. Some windows may be configured to be opened and closed, which may allow other methods of heat transfer to occur (e.g., as a mass of air flows into or out of building 150).

In the exemplary embodiments, building monitoring system 110 (shown in FIG. 1) may also include window sensors 444a, 444b, and 444c (collectively 444). In some embodiments, sensors 444 may be similar to sensors 120 (shown in FIG. 1) and/or sensors 468 (shown in FIG. 4b). In some embodiments, at least one external window sensor 444a may be attached on an external environment 406 side of window 440, and at least one internal window sensor 444b may be attached on an interior 430 side of window 440. Further, in some embodiments, an interior sensor 444c and an exterior sensor 468a may also be included.

In the exemplary embodiment, building monitoring system 110 may collect profile data associated with one or more windows 440 from associated sensors 444. For example, building monitoring system 110 may collect profile thermal data from sensors 444 at a particular point in time or period of time, as well as an external temperature and/or internal temperature at the time of collection. Building monitoring system 110 may store this thermal data as a profile element associated with a particular window. Later, building monitoring system 110 may collect sample data (e.g., from sensors 444) at a sample time or time period.

Building monitoring system 110 may identify a profile element from a plurality of profile elements associated with the particular window that most closely matches the sample data (e.g., based upon external temperatures). Building monitoring system 110 may compare the sample data to the identified profile element.

Figure 4D:
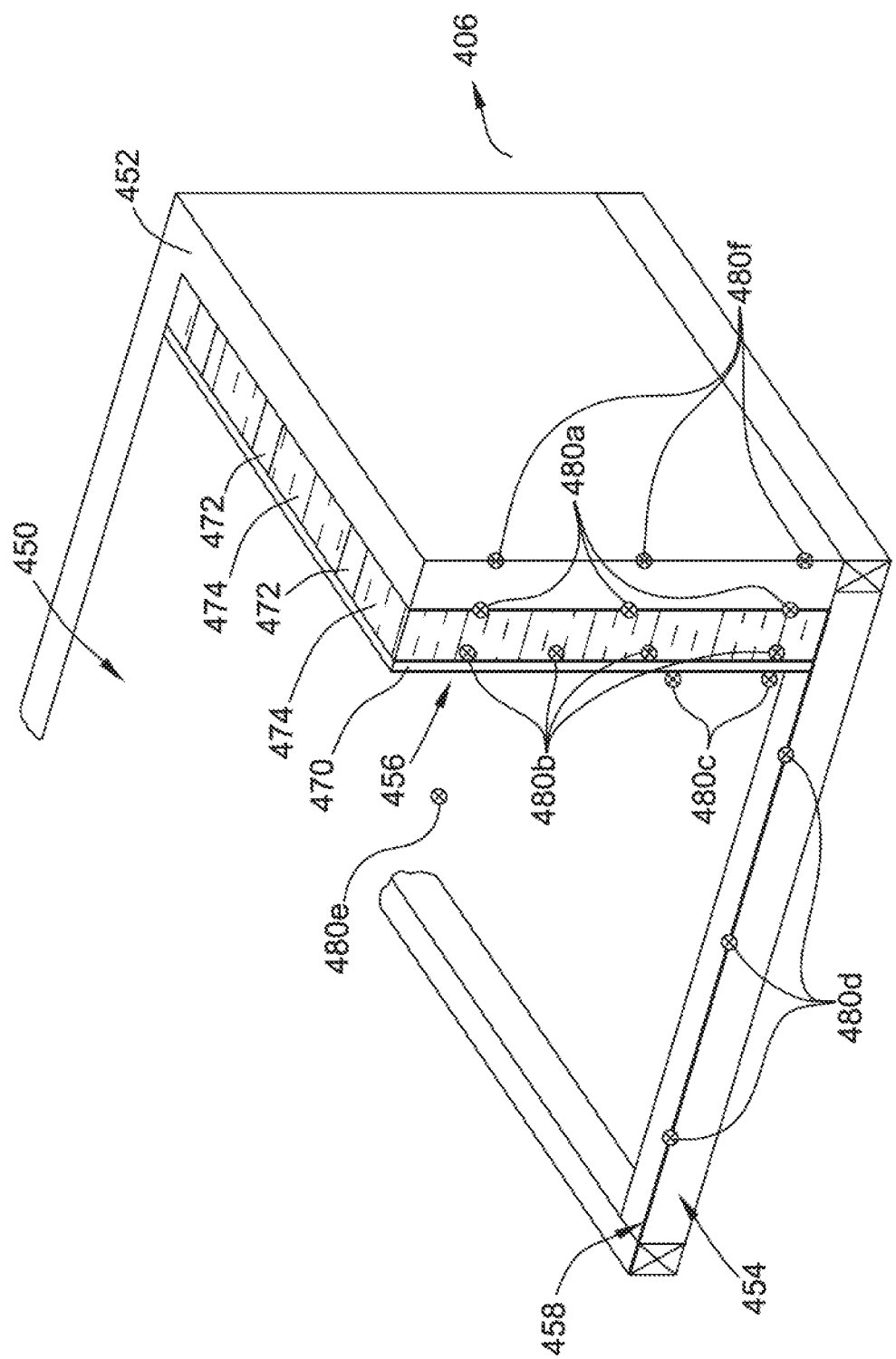

FIG. 4d depicts the foundation of a basement 450, including foundation walls 452 and foundation floor 454, and also including a "finished" wall 456 (e.g., drywall and insulation) and a flooring layer 458 (e.g., carpeting) that are also a part of thermal system 400. In FIG. 4d, only one foundation wall 452 is shown for ease of illustration, but more are possible. In the exemplary embodiment, foundation wall 452 may be exposed on one side to external environment 406, which may include soil, rock, or other earthen materials, and/or the surrounding environment (e.g., open air).

On the interior (e.g., basement region 450), foundation wall 452 may be bordered by finished wall 456. Finished wall 456 may include an interior layer 470 (e.g., drywall, wood paneling, and/or other sheet material) supported by a plurality of vertically-oriented framing members 472. Between each frame member 472 may be insulation material 474 (e.g., an insulation layer similar to insulation layer 432 (shown in FIG. 4b). Further, in the example embodiment, foundation floor 454 may be bordered on the interior (e.g., basement region 450) by flooring layer 458. Floor layer 458 may include carpeting, tile, synthetic or real wood, or other flooring.

In the exemplary embodiment, building monitoring system 110 (shown in FIG. 1) may include basement sensors 480a, 480b, 480c, 480d, 480e, and/or 480f (collectively 480) that are configured to collect temperature data at various positions. In some embodiments, sensors 480 may be similar to sensors 120 (shown in FIG. 1), sensors 468 (shown in FIG. 4b), and/or sensors 444 (shown in FIG. 4c).

In some embodiments, basement sensors 480 may include one or more foundation wall sensors 480a proximate (e.g., coupled to) foundation wall 452. Foundation wall sensors 480a may measure a surface temperature of the interior side of foundation wall 452. In some embodiments, foundation wall sensors 480 may be similar to exterior face sensors 468c (shown in FIG. 4b). Basement sensors 480 may also include one or more interior inner sensors 480b proximate (e.g., coupled to) interior layer 470, and within finished wall 456 (e.g., within columns of insulation 474). In some embodiments, interior inner sensors 480b may be similar to interior inner sensors 468e (shown in FIG. 4b). Basement sensors 480 may also include one or more interior sensors 480c proximate (e.g., coupled to) interior layer 470, but outside of finished wall 456.

In the exemplary embodiment, basement sensors 480 may also include one or more foundation floor sensors 480d (e.g., coupled to foundation floor 454). In some embodiments, foundation floor sensors 480d may be positioned between foundation floor 454 and flooring layer 458.

Further, in some embodiments, basement sensors 480 may include a basement sensor 480e that is configured to gather temperature data from within basement region 450 (e.g., an ambient air temperature of basement 450). In some embodiments, basement sensors 480 may include an exterior sensor 480f that is configured to gather temperature data from external environment 406 (e.g., an outside soil temperature proximate foundation wall 452).

In some embodiments, sensors 480 may be placed at varying heights, or at multiple horizontal positions, along foundation wall 452 and/or finished wall 456. Some areas may, for example, exhibit differing thermal transfer properties. As such, data from differing regions of foundation wall 452 and/or finished wall 456 may be analyzed to determine relatively-weaker or stronger insulated areas.

In the exemplary embodiment, building monitoring system 110 may collect profile data associated with basement region 450 overall, and/or one or more of foundation walls 452, foundation floor 454, finished wall 456, from associated sensors 480. For example, building monitoring system 110 may collect profile thermal data from sensors 480 at a particular point in time or period of time, as well as an external temperature and/or internal temperature at the time of collection. Building monitoring system 110 may store this thermal data as a profile element associated with basement region 450 overall, and/or with a particular foundation wall 452, foundation floor 454, and/or finished wall 456. Later, building monitoring system 110 may collect sample data (e.g., from sensors 480) at a sample time or time period. Building monitoring system 110 may identify a profile element from a plurality of profile elements that most closely matches the sample data (e.g., based upon external temperatures). Building monitoring system 110 may compare the sample data to the identified profile element.

Referring now to FIGS. 4a-4d, in the exemplary embodiment, building monitoring system 110 may receive temperature data from one or more of sensors 468, 444, and/or 480, and/or may analyze temperature data to determine the thermal effectiveness of thermal system 400 (e.g., of exterior wall 431, windows 440, and/or basement region 450). In some embodiments, building monitoring system 110 may identify a baseline thermal profile for building 150. Building monitoring system 110 may collect a profile thermal data set including a plurality of thermal sensor samples from sensors 468, 444, and/or 480 at a given time (or during a particular time period) (referred to herein as a "baseline time"), as well as "HVAC data" (heating, ventilation, air conditioning data) associated with the baseline time (e.g., operational data such as run times and/or power-on/off events for furnace 404 and/or AC 402).

For example, building monitoring system 110 may generate a profile element for the baseline thermal profile for a winter nighttime in which building 150 is exposed to cooler temperatures (e.g., a night-time low external temperature of 50 degrees (°) Fahrenheit (F)), and during which furnace 404 activates one or more times to maintain an internal temperature (e.g., a fixed temperature of 70° F.).

To build a profile element, building monitoring system 110 may receive a thermostat temperature from the thermostat (not shown) (e.g., 70° F.), and collect temperature data from sensors 468 (e.g., a temperature of external environment 406) over a baseline time (e.g., 6 pm to 6 am). Further, building monitoring system 110 may also receive HVAC data from furnace 404 during that baseline time (e.g., when the furnace starts and stops, or running time(s) during that period).

From this profile data, building monitoring system 110 may compute a profile element associated with thermostat setting of 70° F., a night-time low of 50° F., and a baseline time of 6 pm to 6 am. In some embodiments, the profile element may identify a total runtime of furnace 404 over that period (e.g., 75 total running minutes over those 12 hours) and/or store the total runtime with the profile element.

During operation (e.g., after one or more profile elements are generated for building 150), building monitoring system 110 may apply the baseline profile to the monitoring of building 150. More specifically, in one embodiment, building monitoring system 110 may collect thermal data (a "sample thermal data set") from sensors 468 during a later time period (referred to herein as a "sample period"). This sample thermal data set may include any or all types of data from the baseline profile (e.g., thermostat setting, night-time low, timeframe, and total runtime of furnace 404 or AC 402).

For example, presume building monitoring system 110 is collecting a sample thermal data set for building 150 during one particular evening several years after the profile element described above was generated. From 6 pm to 6 am that evening (i.e., the sample period), homeowner 102 had the thermostat set at 70° F., and the night-time low was 49° F. Building monitoring system 110 may collect sample thermal data from sensors 468 over the sample period, as well as total running time of 90 minutes for furnace 404 during that same period.

Once collection is complete, building monitoring system 110 may search the plurality of profile elements to find a profile element matching (or most similar to) the particular sample data (e.g., nearest to thermostat setting of 70° F. and night-time low of 49° F.) and/or identify the above-described profile element. This profile element may represent the profile element most similar to the sample conditions, and thus may provide a more reliable indicator of expected furnace runtime (e.g., if thermal system 400 is still functioning as well as it was when the profile element was generated, years prior). In other words, to the extent that the actual furnace runtime during the sample period deviates from the profile furnace runtime, this may be an indication of the effectiveness (or deteriorated effectiveness) of thermal system 400 (e.g., in restricting heat escape from building 150).

Accordingly, building monitoring system 110 may compare the profile furnace runtime to the sample furnace runtime to generate a delta runtime. Continuing the above-described example, building monitoring system 110 may subtract the baseline furnace runtime of 75 minutes to the sample furnace runtime of 90 minutes to generate a delta runtime of 15 minutes. In other words, at the sample time, furnace 404 is required to run for 15 minutes longer than it had to in years past (e.g., at the time the profile element was created) in order to maintain the same interior temperature.

Building monitoring system 110 may use this delta runtime as a score ("thermal score") for thermal system 400.

In some embodiments, building monitoring system 110 may generate a warning or an alert when the thermal score for thermal system 400 exceeds a pre-determined threshold, such as 30 minutes more than the baseline furnace runtime. As such, when thermal system 400 deteriorates to a point when furnace 404 has too much additional runtime required to maintain the same internal temperature, homeowner 102 will be alerted and may take corrective actions (e.g., replacing or improving components of thermal system 400, such as insulation 412, 432 or windows 440).

In some embodiments, building monitoring system 110 may generate a plurality of profile elements, for example, associated with various thermostat settings (e.g., 72° F., 68° F., 65° F.), various night-time lows (e.g., 20° F., 35° F., 60° F.). Because these and other various factors may change over the years of homeowner's 102 use of building 150, and because the particular environmental factors of particular days may vary, having a pool of varied profile elements may improve performance of building monitoring system 110 as a more similar profile element may be identifiable and used for a greater variety of sample situations.

Similarly, in some embodiments, building monitoring system 110 may perform similar profile generation and sample collection associated with AC 402. In other words, on hotter days (e.g., external temperature of 95° F.), AC 402 runs to maintain an internal temperature (e.g., thermostat set to 78° F.). As such, building monitoring system 110 may generate one or more profile elements having AC runtimes over, for example, the hotter times of the day, such as 6 am to 6 pm. Each such profile element may similarly include HVAC data of AC runtime over the time period, and similarly compare the AC runtime to the AC runtime during a later sample period. The thermal effectiveness of thermal system 400 may additionally, or alternatively, be scored based at least in part on AC runtime.

Further, in some embodiments, particular regions may similarly be individually analyzed as described above. For example, basement region 450 may be analyzed using data from sensors 480, and interior 430 may be separately analyzed using data from sensors 468. As such, particular problem areas for thermal system 400 may be identified for improvement or replacement.

IV. Exemplary Foundation System and Sensors

Figure 5:
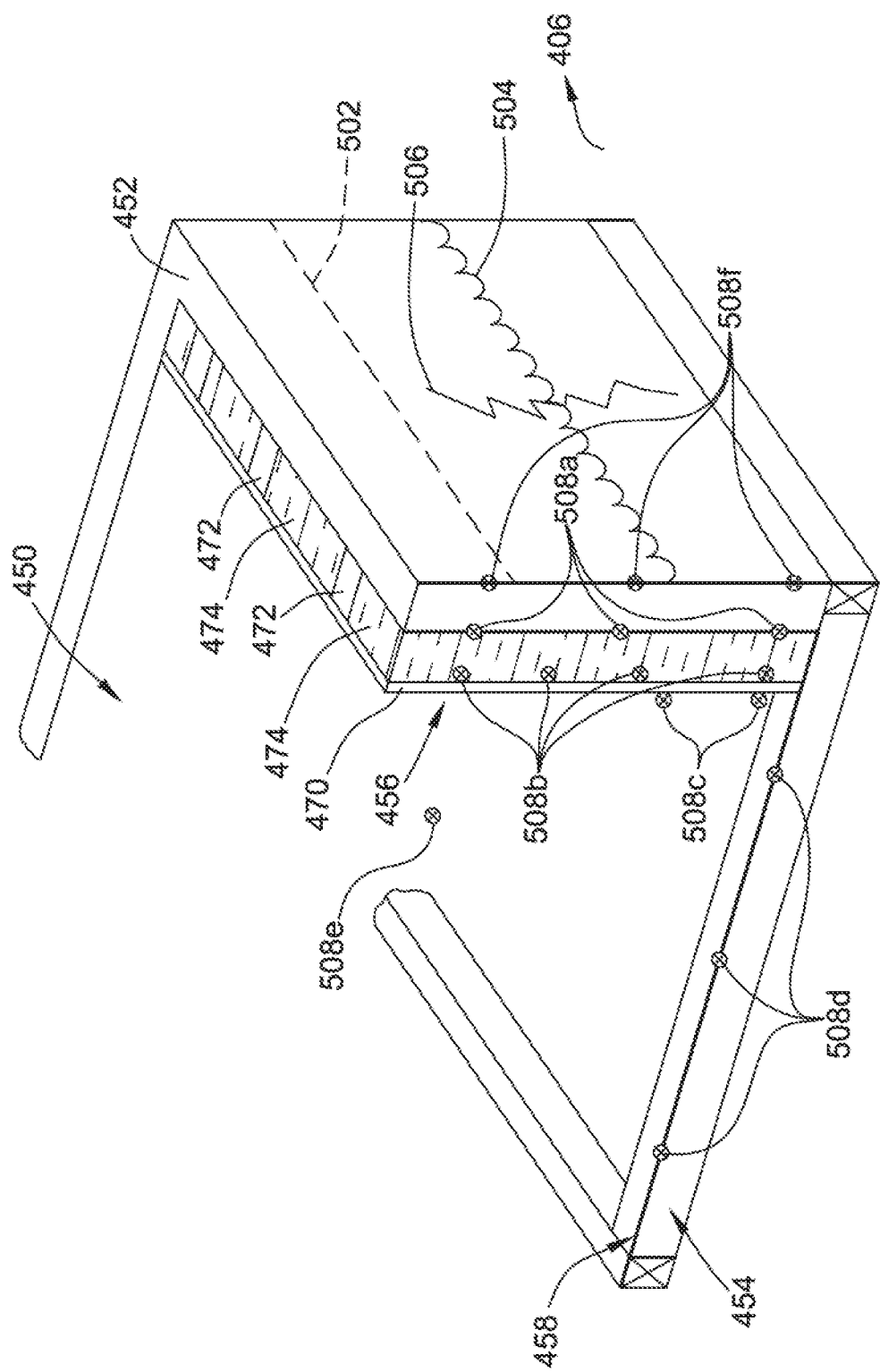
FIG. 5 depicts an exemplary foundation system including a foundation of the basement shown in FIG. 4d that includes components similar to the thermal system as shown and described above in reference to FIG. 4d.

FIG. 5 depicts an exemplary foundation system 500 including the foundation of basement 450 that includes several components similar to the thermal system 400 as shown and described above in reference to FIG. 4d. In the exemplary embodiment, at least some of the basement components shown in FIG. 5 are components of foundation system 500, and may be configured to restrict water entry into building 150 and, more specifically, into basement region 450.

For example, after installation, foundation walls 452 and foundation floor 454 may be substantially sealed from external environment 406 such that surrounding water (e.g., in the surrounding soil after a rain event) is prohibited from entering basement region 450. Further, in some embodiments, a sealing component or layer (not shown) may be applied to an interior surface (not shown) of foundation wall 452 and/or foundation floor 454 to additionally help inhibit water entry into basement region 450.

Over time, a once-sealed foundation may develop cracks, and those cracks may allow water to penetrate the foundation at various points. This water entry can cause property damage and health risks in the form of, for example, mold growth and rotting or other destruction of interior components (e.g., flooring layer 458, components of finished wall 456, and any other personal property or structural components present in basement region 450).

Further, when basement region 450 includes one or more finished walls 456 adjacent to foundation walls 452, the presence of the finished wall makes the foundation wall difficult to visually inspect for cracks and/or leaks. As such, when a leak occurs behind a finished wall, the compromise may go undetected for an extended period of time, and may cause additional property damage because of this delay in detection.

In the exemplary embodiment, a foundation crack 506 has occurred in foundation wall 452. Crack 506 is below a soil line 502, indicating a level of soil around the foundation. In other words, foundation wall 452 is exposed to ambient air above soil line 502, and is exposed to soil (and any water in the soil) below soil line 502. As such, crack 506 is not visible to the building owner on visual inspection because it appears in foundation wall 452 below soil line 502. In addition, because of the presence of finished wall 456, an interior counterpart (not shown) of crack 506 is not immediately available to visual inspection (i.e., without removing some of finished wall 456). In other words, homeowner 102 (shown in FIG. 1) may be completely unaware of the presence of crack 506 until other events manifest themselves (e.g., until the presence of leaking water or mold becomes visually apparent).

During a rain event, water may enter the surrounding soil (e.g., in external environment 406 proximate foundation wall 452). In some situations, a water table 504 may develop around the foundation of building 150. Water table 504 may define a level or high water mark at which water has fully saturated the surrounding soil/earth environment. Below the level of water table 504, additional hydrostatic pressure may occur. In the example embodiment, at least some of crack 506 may be below water table 504, and water table 504 may be forcing water through crack 506 and into basement region 450. More specifically, water may be leaking into basement region 450 behind finished wall 456. In other embodiments, crack 506 may occur within foundation floor 454, and water may be leaking into basement region 450 underneath flooring layer 458 (and thus potentially causing a similar detectability problem for homeowner 102).

In the exemplary embodiment, building monitoring system 110 (shown in FIG. 1) may include a plurality of moisture sensors 508a, 580b, 580c, 580d, 580e, and/or 508f (collectively 508). In some embodiments, moisture sensors 508 may be similar to sensors 120 (shown in FIG. 1) and/or water sensors 270 (shown in FIG. 2).

In the exemplary embodiment, moisture sensors 508 may be configured to collect moisture data at various positions. In some embodiments, moisture sensors 508 may include one or more foundation wall sensors 508a proximate (e.g., coupled to) foundation wall 452.

Foundation wall sensors 508a may measure moisture levels on the interior side of foundation wall 452. Moisture sensors 508 may also include one or more interior inner sensors 508b proximate (e.g., coupled to) interior layer 470, and/or within finished wall 456 (e.g., within columns of insulation 474). Basement sensors 508 may also include one or more interior sensors 508c proximate (e.g., coupled to) interior layer 470, but outside of finished wall 456.

In the example embodiment, moisture sensors 508 may also include one or more foundation floor sensors 508d (e.g., coupled to foundation floor 454). In some embodiments, foundation floor sensors 508d may be positioned between foundation floor 454 and flooring layer 458. Further, in some embodiments, moisture sensors 508 may include a basement sensor 508e that is configured to gather moisture data from within basement region 450 (e.g., an ambient air humidity level of basement 450). In some embodiments, moisture sensors 508 may include one or more exterior sensors 508f that are configured to gather moisture data from external environment 406. In some embodiments, moisture sensors 508f may additionally or alternatively be configured to provide hydrostatic pressure data at points around foundation wall 452 and/or foundation floor 454.

In some embodiments, sensors 508 may be placed at varying heights, or at multiple horizontal positions, along foundation wall 452 and/or finished wall 456. Some areas may, for example, exhibit greater likelihood of developing cracks, such as lower regions of foundation wall 452, or at a junction between foundation wall 452 and foundation floor 544. In some embodiments, a matrix of sensors 508, such as array of water sensors 320 (shown in FIG. 3), may be provided on foundation wall 452, either inside (e.g., as an array of sensors 508a) or outside (e.g., as an array of sensors 508f), along foundation floor 544 (e.g., as an array of sensors 508d), and/or on an interior surface of interior layer 470 (e.g., as an array of sensors 508b). In some embodiments, exterior walls 431 of main floor interior 430 may be configured with moisture sensors 508 similar to finished wall 456.

In the exemplary embodiment, building monitoring system 110 may receive moisture data from sensors 508 and analyze moisture data to detect water leak compromises of components of basement region 450 such as, for example, foundation walls 452 and foundation floor 454. In some embodiments, building monitoring system 110 may identify a baseline moisture profile for building 150. Building monitoring system 110 may collect a profile moisture data set including a plurality of moisture sensor samples from sensors 508 at a given time (or during a particular time period) (referred to herein as a "baseline time"). For example, building monitoring system 110 may generate moisture profiles specific to each particular sensor 508 by collecting one or more moisture samples from that sensor and averaging the one or more moisture samples to generate a "profile moisture sample" associated with that sensor.

During operation (e.g., after moisture profiles are built for each particular sensor 508), building monitoring system 110 may apply the baseline profile to the monitoring of building 150. More specifically, in one embodiment, building monitoring system 110 may collect current moisture data (a "sample moisture data set") from sensors 480 at a later time period (referred to herein as a "sample time"). For each sensor 480, building monitoring system 110 may compare the associated current moisture sample to the profile moisture sample.

If the current moisture sample exceeds the profile moisture sample by a pre-determined threshold amount, then an alert may be generated to homeowner 102. This elevated moisture condition (e.g., increased humidity) may, for example indicate that additional water or moisture is now present near the particular sensor because of a crack (e.g., crack 506) has formed in the foundation, through which water is leaking.

V. Exemplary Structural System and Sensors

Figure 6:
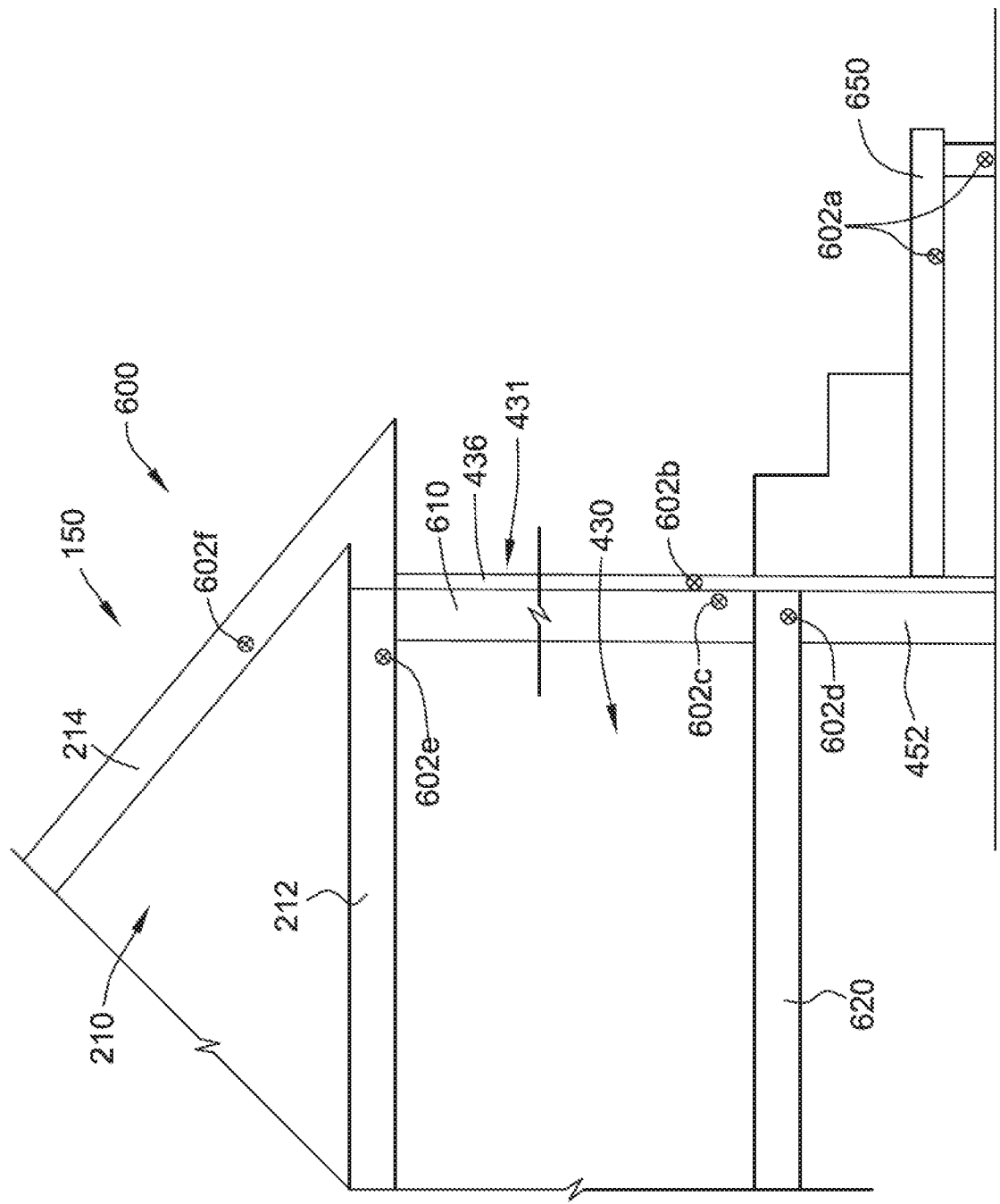
FIG. 6 depicts an exemplary cross-section profile view of the building shown in FIG. 1 including components of a structural system of the building.

FIG. 6 depicts an exemplary cross-section profile view of building 150 including components of a structural system 600 of building 150. In the exemplary embodiment, FIG. 1 illustrates at least some structural components of building 150 that serve to physically support or hold up other components of building 150. For example, roofing system 200 (shown in FIG. 2) may be supported at least in part by ceiling joists 212 and exterior wall 431 (e.g., via vertical supports 610). Similarly, main floor 430 may be supported by at least flooring joists 620 and foundation walls 452. Additionally, decking 650 may be provided to support pedestrian traffic and/or outdoor furniture (not shown).

Further, FIG. 1 also illustrates at least some structural components of building 150 that, for example, serve to isolate interior 430 from external environment 406. For example, exterior layer 436, windows 440 (shown in FIG. 4a), and/or a garage door (not shown) may also be a part of structural system 600.

In the exemplary embodiment, at least some of structural system 600 components, and/or components of other systems described herein, comprise wooden components that may be subject to termite damage. Termites are insects that consume wood and, as such, may cause damage to building 150 if they infest these components. Detection of a termite infestation is difficult to spot by untrained observers such as homeowner 102. In some situations, termites may infest components that are not regularly observed, or not easily visually observed by homeowner 102.

For example, components of decking 650 near the ground or on the underside of decking 650 or wooden components of roofing system 200 may not be easily visible or regularly visited and, as such, a termite infestation may go undetected for considerable time. The longer a termite infestation goes undetected, the greater opportunity the termites have to cause further damage.

In the exemplary embodiment, building monitoring system 110 (shown in FIG. 1) may include a plurality of insect sensors 602a, 602b, 602c, 602d, 602e, and/or 602f (collectively 602). In some embodiments, sensors 602 may be similar to sensors 120 (shown in FIG. 1). In some embodiments, insect sensors 602 may be termite sensors, or sensors configured to detect the presence and/or activity of termites.

Sensors 602, in the exemplary embodiment, may include at least one decking sensor 602a proximate (e.g., coupled to) components of decking 650, such as support components or surface components of decking 650. Sensors 602 may also include at least one surface sensor 602b proximate (e.g., coupled to an interior or exterior surface of) exterior layer 436 (e.g., near a bottom end) and/or at least one support sensor 602c proximate (e.g., attached to) one or more vertical supports 610 (e.g., near a bottom end).

In the exemplary embodiment, sensors 602 may include at least one joist sensor 602d proximate (e.g., attached to) one or more flooring joists 620, as well as at least one joist sensor 602e proximate (e.g., attached to) one or more ceiling joists 212 (e.g., near an intersection with vertical support 610). Further, sensors 602 may include at least one roofing frame sensor 602f proximate (e.g., attached to) one or more locations along roofing frame 210 (e.g., along rafter 214).

In the exemplary embodiment, building monitoring system 110 may receive insect data from sensors 602 and/or analyze the insect data to detect, for example, the presence of termites near or within wooden components building 150 such as, for example, structural system 600.

In some embodiments, at least some of structural system 600 components, and/or components of other systems described herein, may be subject to vibration damage, such as from an earthquake. Accordingly, building monitoring system 110 may include one or more vibration sensors 604a, 604b, 604c, 604d, 604e, and/or 604f (collectively 604) attached to components of structural system 600 or otherwise within building 150 that are configured to collect vibration data. In some embodiments, sensors 604 may be similar to sensors 120 (shown in FIG. 1).

Building monitoring system 110 may be configured to identify a vibration profile that includes a threshold or maximum profile vibration level. During operation, building monitoring system 110 may collect vibration samples from vibration sensors 604 and/or compare the vibration samples to the threshold profile vibration level. When the sample vibration level exceeds the profile vibration level, building monitoring system 110 may generate a vibration alert to a user such as homeowner 102, who may then inspect building 150 for possible damage.

VI. Exemplary Method of Monitoring Building Health

Figure 7:
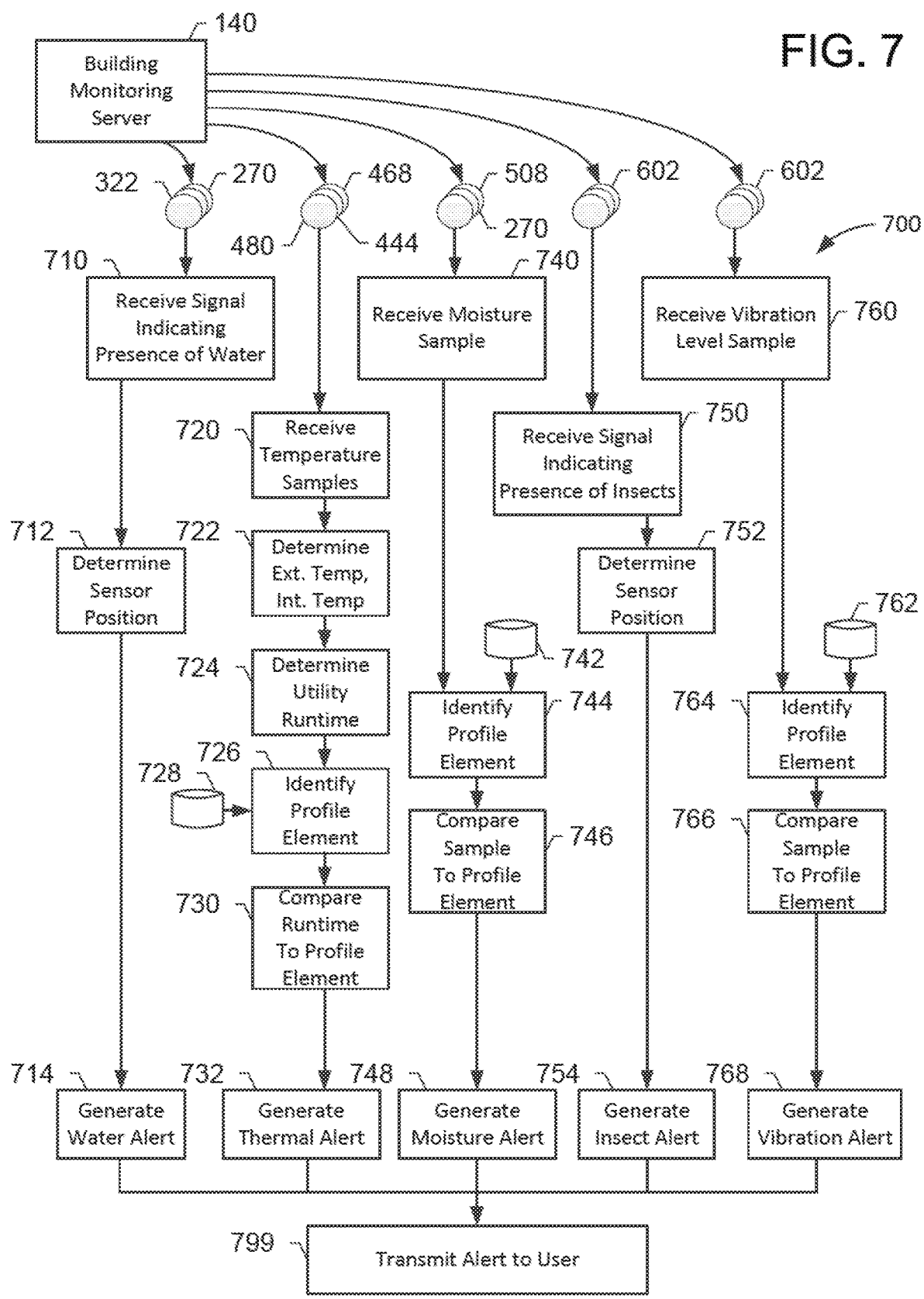
FIG. 7 depicts a flow chart of an exemplary method of monitoring building health of the building shown in FIG. 1 by the building monitoring system shown in FIG. 1.

FIG. 7 depicts a flow chart of an exemplary method 700 of monitoring building health of a building 150 (shown in FIG. 1) by a building monitoring system 110 (shown in FIG. 1). In the exemplary embodiment, method 700 may be performed by one or more computing systems, such as building monitoring server 140 (also shown in FIG. 1), and/or computing device 1310 (shown in FIG. 13).

In the exemplary embodiment, method 700 may also be performed with at least one water sensor 270, 322 positioned at a first position within the roofing system of the building and/or configured to detect the presence of water near the at least one water sensor 270, 322. Method 700 may include receiving 710 a signal from the at least one water sensor indicating the presence of water. Method 700 may also include determining 712 the first position within the roof of the building. Method 700 may further include generating 714 a water alert indicating the presence of water at the first position. Method 700 may also include transmitting 799 a water alert message to a user of the building monitoring computer system.

In the exemplary embodiment, method 700 may also be performed with at least one external thermal sensor 468a configured to provide external environment temperature data of an external environment proximate the building. Building monitoring server 140 may include a memory (not shown in FIG. 7) including a thermal profile 728 of the building, the thermal profile including a plurality of profile elements, each profile element including a profile internal temperature, at least one profile external temperature, and/or a profile utility run time associated with one of a furnace and an air conditioning device associated with the building.

Method 700 may include receiving 720 a plurality of temperature samples from the at least one external thermal sensor during a sample time period. Method 700 may also include determining 722 one of a minimum external temperature and a maximum external temperature for the external environment during the sample time period. Method 700 may further include determining 724 a sample utility run time associated with the one of the furnace and the air conditioning device during the sample time period.

Method 700 may include determining 722 a sample internal temperature during the sample time period. Method 700 may include identifying 726 the corresponding profile element from the thermal profile 728 based at least in part on the sample internal temperature, and/or one of the minimum external temperature and the maximum external temperature. Method 700 may also include comparing 730 the sample utility run time to the identified profile utility run time to generate a utility run time difference. Method 700 may further include determining, based on comparing 730, that the utility run time difference exceeds a pre-determined threshold. Method 700 may include generating 732 a thermal alert based upon determining that the run time difference exceeds the pre-determined threshold. Method 700 may further include transmitting 799 a thermal alert message to a user of the building monitoring computer system.

In the exemplary embodiment, method 700 may also be performed with at least one moisture sensor 508, 270 positioned at a first position within the foundation system of the building and/or configured to provide a moisture level proximate to the at least one moisture sensor. Building monitoring server 140 may also include a memory (not shown) including a moisture profile 742 of the building, the moisture profile including a profile moisture level associated with the first position.

Method 700 may include receiving 740 a sample moisture level from the moisture sensor. Method 700 may also include comparing 746 the sample moisture level to the profile moisture level to generate a moisture level difference.

Method 700 may include generating 748 a moisture alert based upon determining that the moisture level difference exceeds a pre-determined threshold. Method 700 may also include transmitting 799 a moisture alert message to a user of the building monitoring computer system.

In the exemplary embodiment, method 700 may be further performed with at least one insect sensor 602 positioned at a first position proximate a structural component of the structural system and/or configured to detect the presence of an insect infestation proximate to the first position. Method 700 may include receiving 750 a signal from the at least one insect sensor indicating the insect infestation.

Method 700 may include determining 752 the first position within the structure of the building. Method 700 may further include generating 754 an insect alert indicating the presence of an insect infestation at the first position. Method 700 may also include transmitting 799 an insect alert message to a user of the building monitoring computer system.

In the exemplary embodiment, method 700 may also be performed with at least one vibration sensor positioned at the first position and/or configured to detect the presence of vibrations proximate to the first position. Building monitoring server 140 may include a memory (not shown in FIG. 7) including identifying 764 a vibration profile 762 of the building, the vibration profile including a maximum profile vibration level at a first position proximate a structural component of the structural system, wherein the maximum profile vibration level represents a level of vibration likely to cause damage to the structural component proximate to the first position.

Method 700 may include receiving 760 a signal from the at least one vibration sensor including a sample vibration level proximate to the first position. Method 700 may also include comparing 766 the sample vibration level to the maximum profile vibration level.

Method 700 may include determining, based on comparing 766, that the sample vibration level exceeds the maximum profile vibration level. Method 700 may also include generating 768 a vibration alert indicating that the structural component near the first position has experienced a potentially damaging vibration level. Method 700 may further include transmitting 799 a vibration alert message to a user of the building monitoring computer system.

Figure 8:
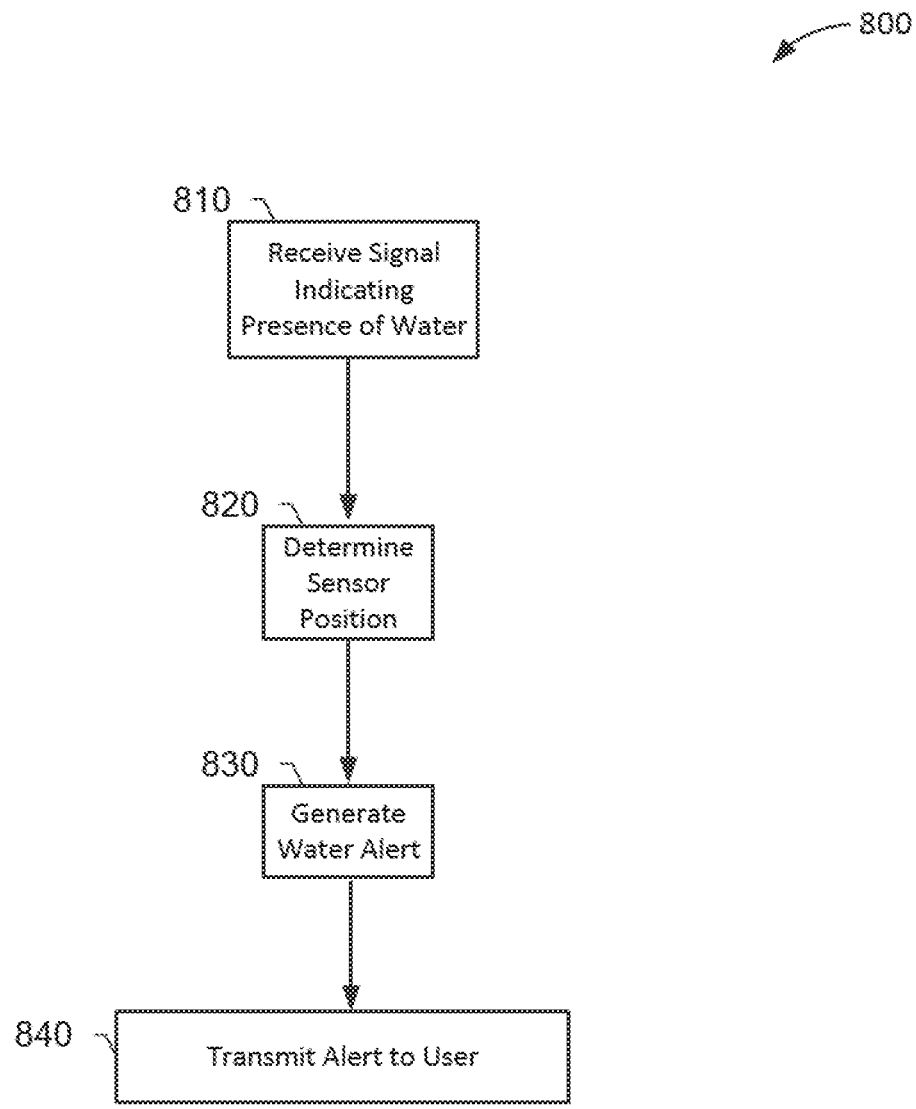
FIG. 8 depicts a flow chart of an exemplary method of monitoring building health of the building shown in FIG. 1 by a building monitoring system shown in FIG. 1.

FIG. 8 depicts a flow chart of an exemplary method 800 of monitoring building health of a building 150 (shown in FIG. 1) by a building monitoring system 110 (shown in FIG. 1). In the exemplary embodiment, method 800 may be performed by one or more computing systems, such as building monitoring server 140 (shown in FIG. 1), and/or computing device 1310 (shown in FIG. 13). In the exemplary embodiment, method 800 may be performed with at least one water sensor 270, 322 (shown in FIGS. 2 and 3, respectively) positioned at a first position within the roofing system of the building and configured to detect the presence of water near the at least one water sensor 270, 322.

Method 800 may include receiving 810 a signal from the at least one water sensor indicating the presence of water. Method 800 may include determining 820 the first position within the roof of the building. Method 800 may further include generating 830 a water alert indicating the presence of water at the first position. Method 800 may also include transmitting 840 a water alert message to a user of the building monitoring computer system.

Figure 9:
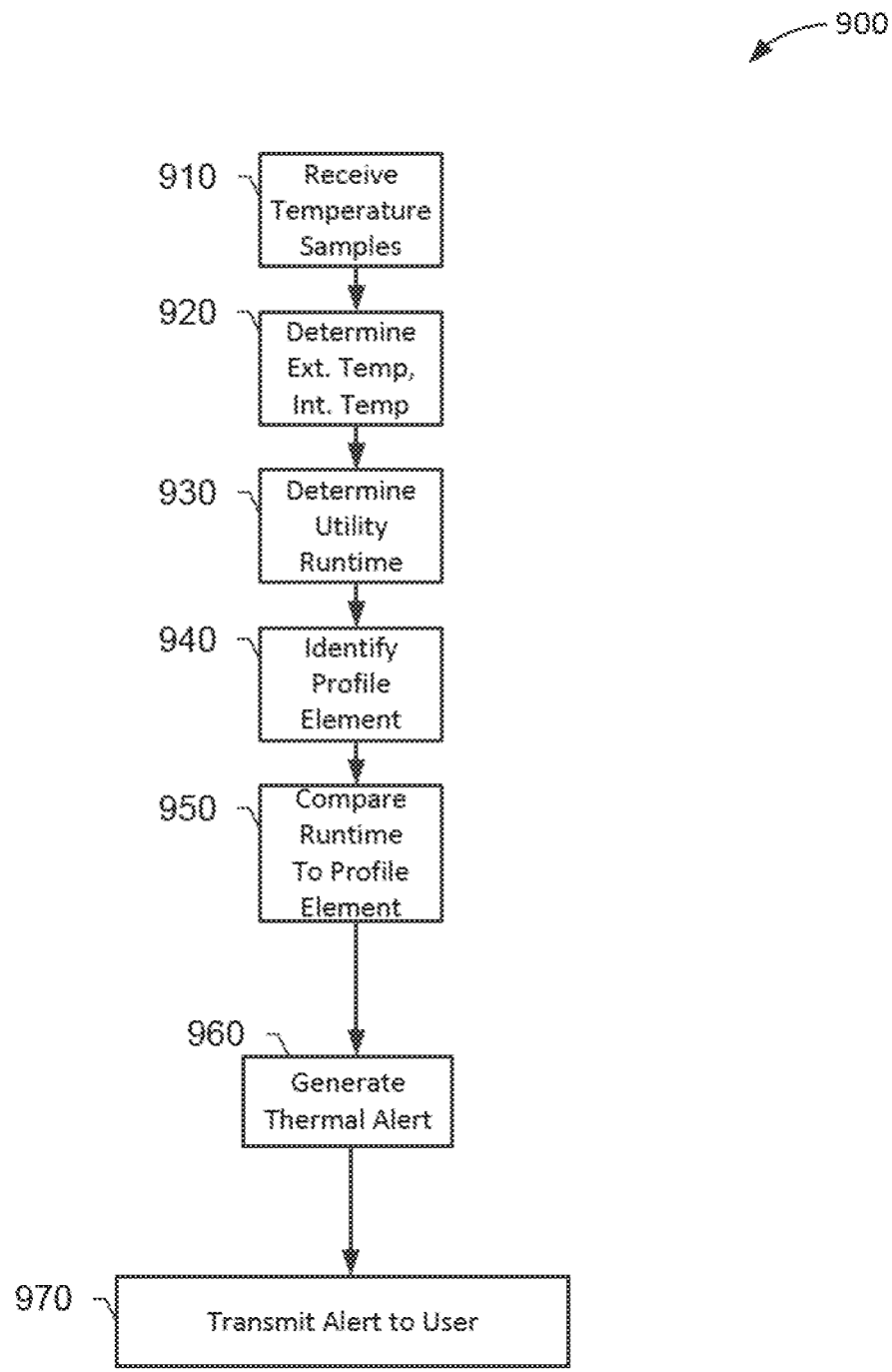
FIG. 9 depicts a flow chart of an exemplary method of monitoring building health of the building shown in FIG. 1 by the building monitoring system shown in FIG. 1.

FIG. 9 depicts a flow chart of an exemplary method 900 of monitoring building health of a building 150 (shown in FIG. 1) by a building monitoring system 110 (shown in FIG. 1). Method 900 may be performed by one or more computing systems such as building monitoring server 140 (shown in FIG. 1), and/or computing device 1310 (shown in FIG. 13).

Method 900 may be performed with at least one external thermal sensor 468a configured to provide external environment temperature data of an external environment proximate the building. Building monitoring server 140 may include a memory (not shown in FIG. 7) including a thermal profile of the building, the thermal profile including a plurality of profile elements, each profile element including a profile internal temperature, at least one profile external temperature, and/or a profile utility run time associated with one of a furnace and an air conditioning device associated with the building.

Method 900 may include receiving 910 a plurality of temperature samples from the at least one external thermal sensor during a sample time period. Method 900 may include determining 920 one of a minimum external temperature and a maximum external temperature for the external environment during the sample time period. Method 900 may include determining 930 a sample utility run time associated with the one of the furnace and the air conditioning device during the sample time period. Method 900 may also include determining 920 a sample internal temperature during the sample time period. Method 900 may further include identifying 940 the corresponding profile element from the thermal profile based at least in part on the sample internal temperature, and/or one of the minimum external temperature and the maximum external temperature.

Method 900 may include comparing 950 the sample utility run time to the identified profile utility run time to generate a utility run time difference. Method 900 may include determining, based on comparing 950, that the utility run time difference exceeds a pre-determined threshold.

Method 900 may include generating 960 a thermal alert based upon determining that the run time difference exceeds the pre-determined threshold. Method 900 may further include transmitting 970 a thermal alert message to a user of the building monitoring computer system.

Figure 10:
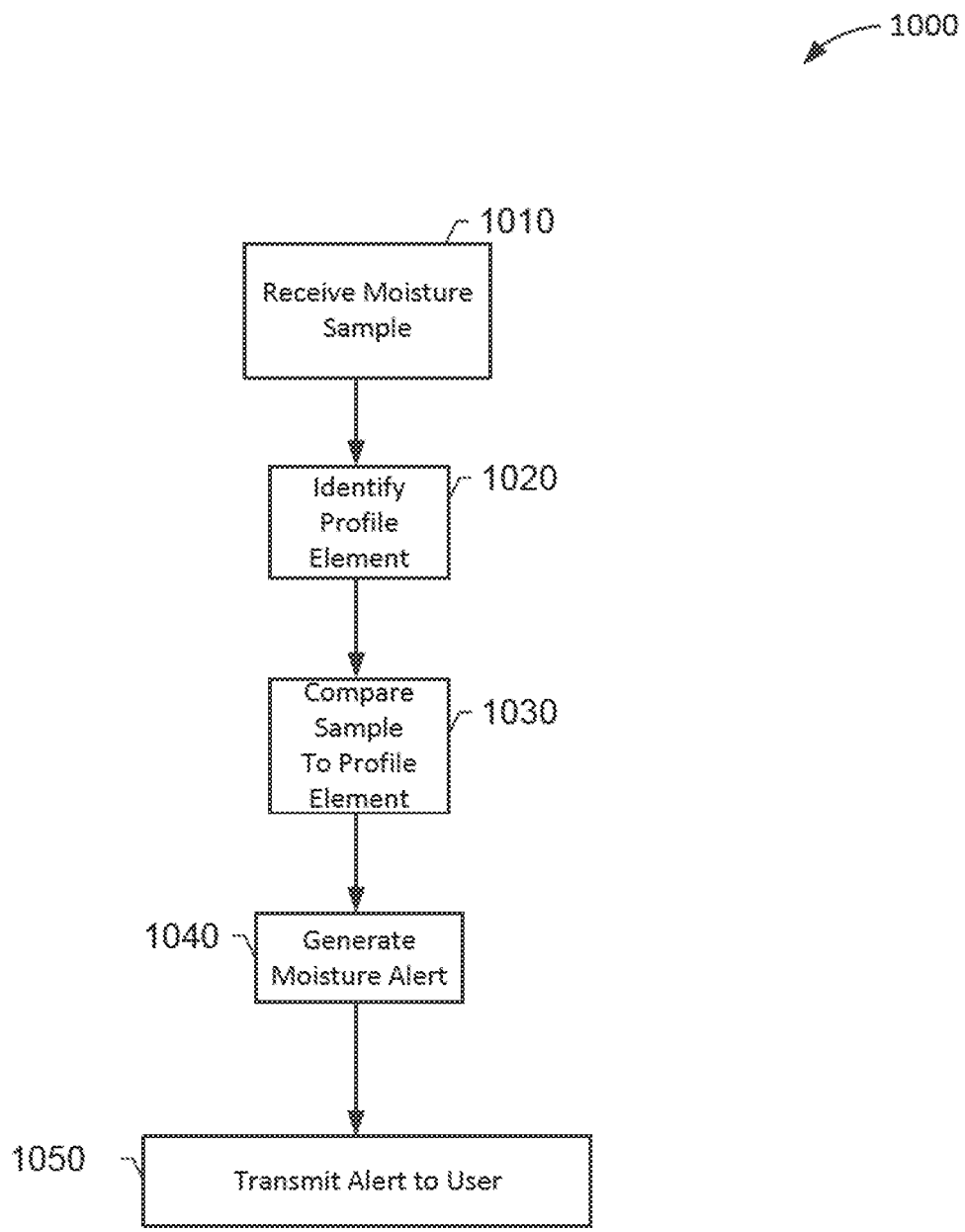
FIG. 10 depicts a flow chart of an exemplary method of monitoring building health of the building shown in FIG. 1 by the building monitoring system shown in FIG. 1.

FIG. 10 depicts a flow chart of an exemplary method 1000 of monitoring building health of a building 150 (shown in FIG. 1) by a building monitoring system 110 (shown in FIG. 1). In the exemplary embodiment, method 900 may be performed by one or more computing systems, such as building monitoring server 140 (shown in FIG. 1), and/or computing device 1310 (shown in FIG. 13).

Method 700 may be performed with at least one moisture sensor 508, 270 (shown in FIGS. 5 and 2, respectively) positioned at a first position within the foundation system of the building and/or configured to provide a moisture level proximate to the at least one moisture sensor. Building monitoring server 140 may include a memory (not shown) including a moisture profile of the building, the moisture profile including a profile moisture level associated with the first position.

In the exemplary embodiment, method 1000 may include receiving 1010 a sample moisture level from the moisture sensor. Method 1000 may include identifying 1020 a profile element from the profile. Method 1000 may include comparing 1030 the sample moisture level to the profile moisture level to generate a moisture level difference.

Method 1000 may include generating 1040 a moisture alert based upon determining that the moisture level difference exceeds a pre-determined threshold. Method 1000 may further include transmitting 1050 a moisture alert message to a user of the building monitoring computer system.

Figure 11:
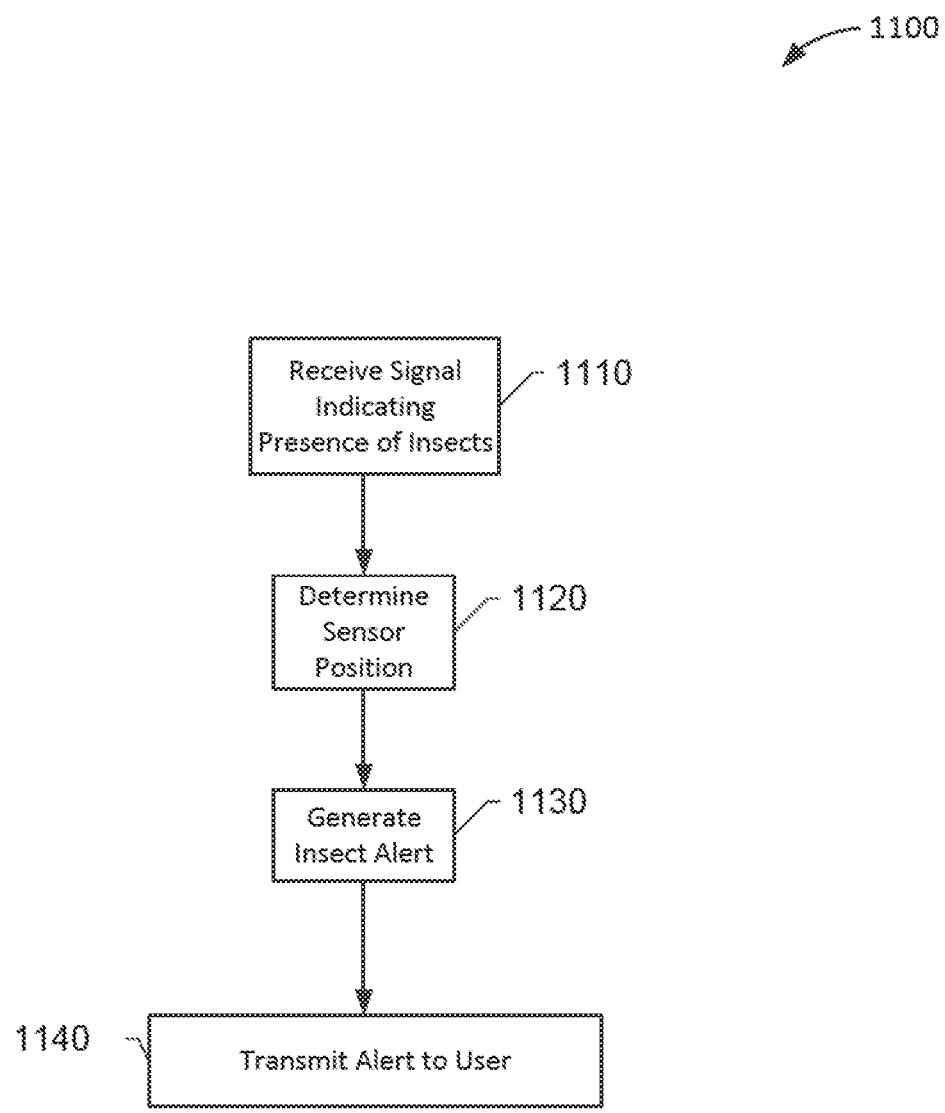
FIG. 11 depicts a flow chart of an exemplary method of monitoring building health of the building shown in FIG. 1 by the building monitoring system shown in FIG. 1.

FIG. 11 depicts a flow chart of an exemplary method 1100 of monitoring building health of a building 150 (shown in FIG. 1) by a building monitoring system 110 (shown in FIG. 1). In the exemplary embodiment, method 1100 may be performed by one or more computing systems such as building monitoring server 140 (shown in FIG. 1), and/or computing device 1310 (shown in FIG. 13). Method 1100 may be further performed with at least one insect sensor 602 positioned at a first position proximate a structural component of the structural system and/or configured to detect the presence of an insect infestation proximate to the first position.

Method 1100 may include receiving 1110 a signal from the at least one insect sensor indicating the insect infestation. Method 1100 may also include determining 1120 the first position within the structure of the building. Method 1100 may further include generating 1130 an insect alert indicating the presence of an insect infestation at the first position. Method 1100 may also include transmitting 1140 an insect alert message to a user of the building monitoring computer system.

Figure 12:
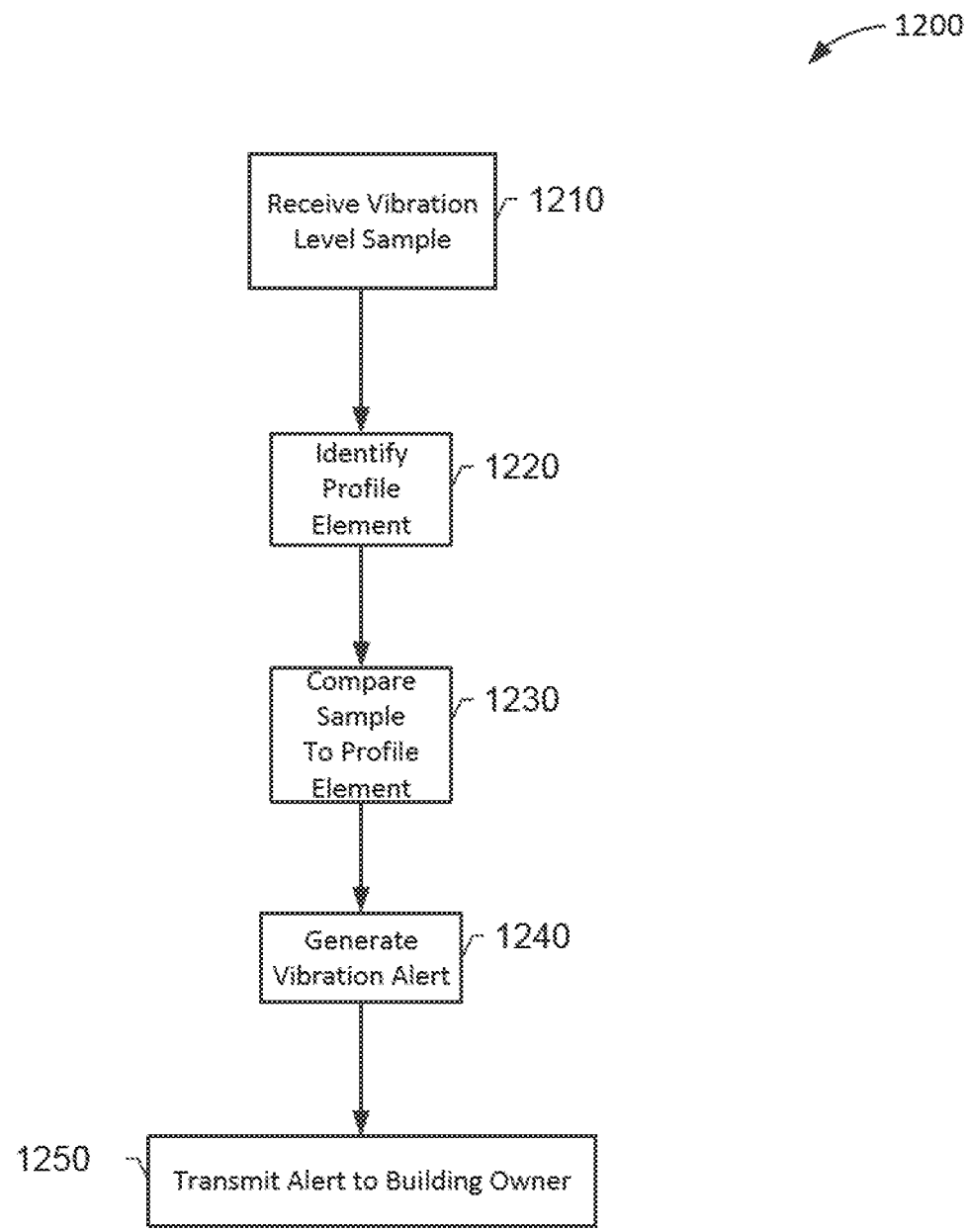
FIG. 12 depicts a flow chart of an exemplary method of monitoring building health of the building shown in FIG. 1 by the building monitoring system shown in FIG. 1.

FIG. 12 depicts a flow chart of an exemplary method 1200 of monitoring building health of a building 150 (shown in FIG. 1) by a building monitoring system 110 (shown in FIG. 1). In the exemplary embodiment, method 1200 may be performed by one or more computing systems, such as building monitoring server 140 (shown in FIG. 1), and/or computing device 1310 (shown in FIG. 13). Method 1200 may be performed with at least one vibration sensor positioned at the first position and/or configured to detect the presence of vibrations proximate to the first position. Building monitoring server 140 may include a memory (not shown in FIG. 7) including identifying 1220 a vibration profile of the building, the vibration profile including a maximum profile vibration level at a first position proximate a structural component of the structural system, wherein the maximum profile vibration level represents a level of vibration likely to cause damage to the structural component proximate to the first position.

In the exemplary embodiment, method 1200 may include receiving 1210 a signal from the at least one vibration sensor including a sample vibration level proximate to the first position. Method 1200 may include comparing 1230 the sample vibration level to the maximum profile vibration level. Method 1200 may further include determining, based on comparing 1230, that the sample vibration level exceeds the maximum profile vibration level.

Method 1200 may also include generating 1240 a vibration alert indicating that the structural component near the first position has experienced a potentially damaging vibration level. Method 1200 may further include transmitting 1250 a vibration alert message to a user of the building monitoring computer system.

VII. Exemplary Computing Devices

Figure 13:
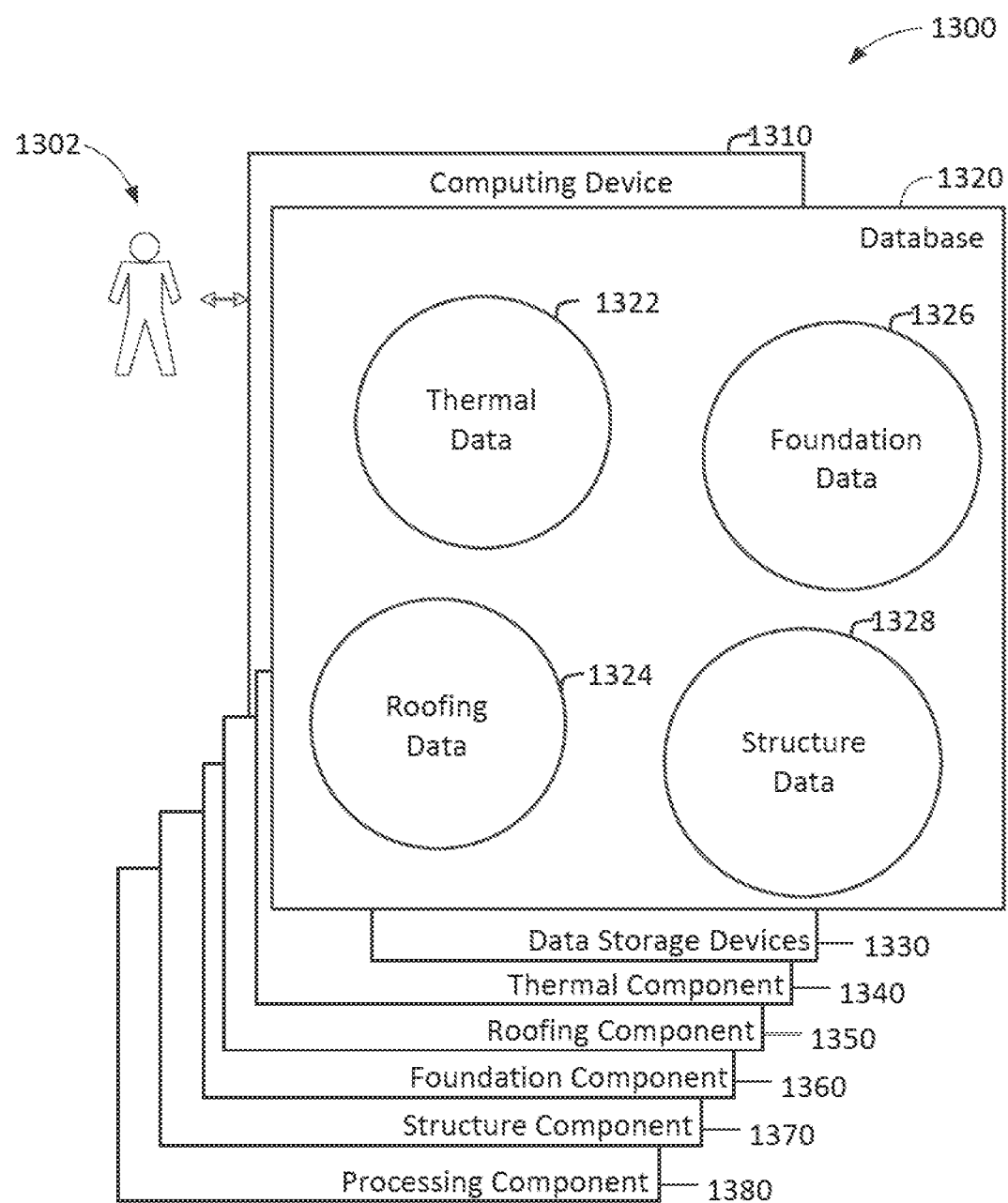
FIG. 13 depicts an exemplary configuration of a database within a computing device, along with other related computing components, that may be used for monitoring building health as described herein.

FIG. 13 depicts an exemplary configuration 1300 of a database 1320 within a computing device 1310, along with other related computing components, that may be used for monitoring building health as described herein. Database 1320 may be coupled to several separate components within computing device 1310, which perform specific tasks. In the exemplary embodiment, computing device 1310 may be a computing component of building monitoring system 110 (shown in FIG. 1), such as building monitor server 140 (shown in FIG. 1) or sensor data collection device 130 (shown in FIG. 1).

In the exemplary embodiment, database 1320 may include thermal data 1322, roofing data 1324, foundation data 1326, and/or structure data 1328. Thermal data 1322 may include information associated with thermal system 400 (shown in FIGS. 4a-4d), such as temperature data. Roofing data 1324 may include information associated with roofing system 200 (shown in FIG. 2), such as water sensor data. Foundation data 1326 may include information associated with foundation system 500 (shown in FIG. 5), such as moisture sensor data. Structure data 1328 may include information associated with structure system 600 (shown in FIG. 6), such as termite sensor data.

Computing device 1310 may include the database 1320, as well as data storage devices 1330. Computing device 1310 may also include a thermal component 1340 for analyzing thermal data 1322 associated with building 150. Computing device 1310 may also include a roofing component 1350 for analyzing roofing data 1324 associated with building 150. Computing device 1310 may also include a foundation component 1360 for analyzing foundation data 1326 associated with building 150. Computing device 1310 may further include a structure component 1370 for analyzing structure data 1328 associated with building 150. A processing component 1380 may assist with execution of computer-executable instructions associated with the system.

Figure 14:
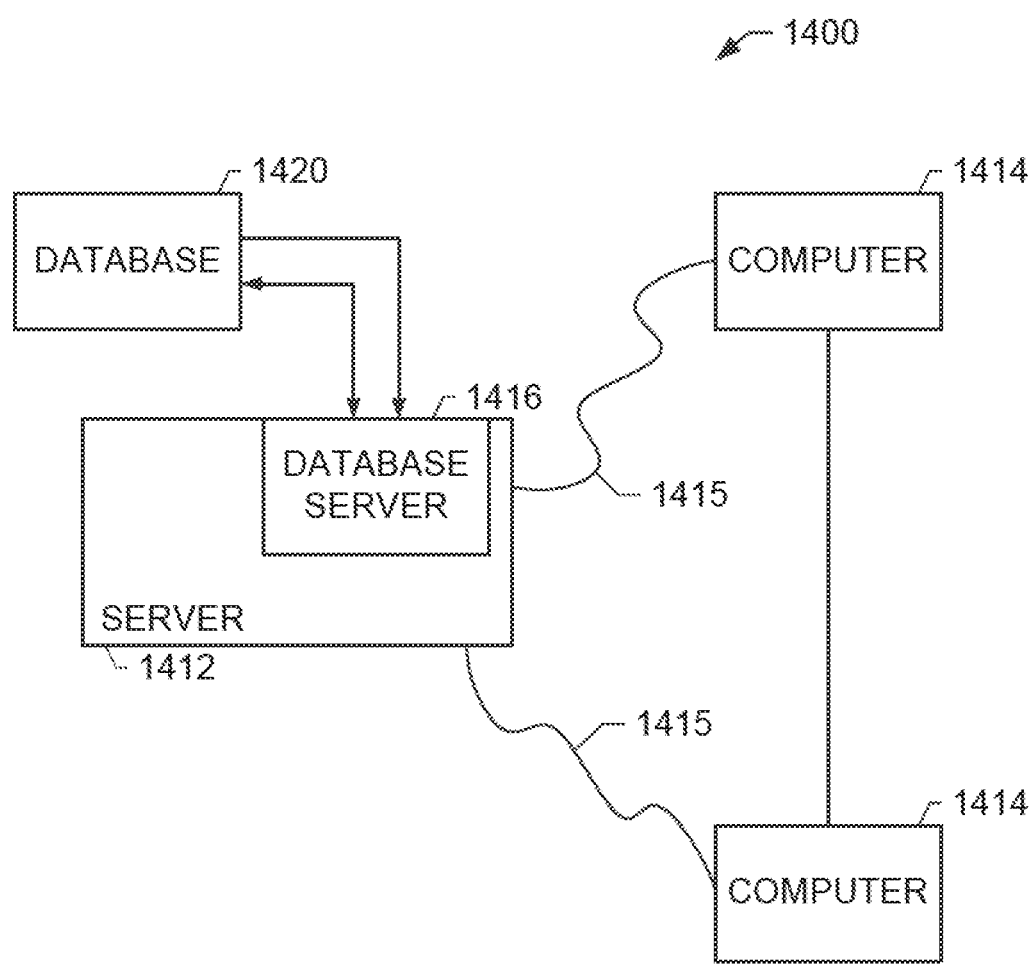
FIG. 14 is a simplified block diagram of an exemplary building monitoring system including a plurality of computer devices connected in communication in accordance with the present disclosure.

FIG. 14 is a simplified block diagram of an exemplary building monitoring system 1400 including a plurality of computer devices connected in communication in accordance with the present disclosure. In some embodiments, building monitoring system 1400 may be similar to building monitoring system 110 (shown in FIG. 1). In the exemplary embodiment, system 1400 may be used for monitoring building health of, for example, building 150 (shown in FIG. 1), and as described herein.

More specifically, in the exemplary embodiment, system 1400 may include a building monitoring server 1412, and one or more client sub-systems (e.g., sensor data collection device 130 (shown in FIG. 1), or a user computing device (not separately shown)), also referred to as client systems 1414, connected to building monitoring server 1412. In one embodiment, client systems 1414 may be computers including a web browser, such that building monitoring server 1412 may be accessible to client systems 1414 using the Internet. Client systems 1414 may be interconnected to the Internet through many interfaces including a network 1415, such as a local area network (LAN) or a wide area network (WAN), dial-in-connections, cable modems, special high-speed Integrated Services Digital Network (ISDN) lines, and RDT networks. Client systems 1414 may be any device capable of interconnecting to the Internet including a web-based phone, PDA, or other web-based connectable equipment.

A database server 1416 may be connected to database 1420, which contains information on a variety of matters, as described herein. In some embodiments, database 1420 may be similar to database 142 (shown in FIG. 1). In one embodiment, centralized database 1420 may be stored on building monitoring server 1412 and may be accessed by potential users at one of client systems 1414 by logging onto building monitoring server 1412 through one of client systems 1414. In an alternative embodiment, database 1420 may be stored remotely from building monitoring server 1412 and may be non-centralized.

Database 1420 may include a single database having separated sections or partitions, or may include multiple databases, each being separate from each other. Database 1420 may store profile data and/or sensor data generated by one or more sensors such as sensors 120 (shown in FIG. 1), 270 (shown in FIG. 2), 322 (shown in FIG. 3), 468 (shown in FIG. 4b), 444 (shown in FIG. 4c), 480 (shown in FIG. 4d), 508 (shown in FIG. 5), and/or 602 (shown in FIG. 6).

Figure 15:
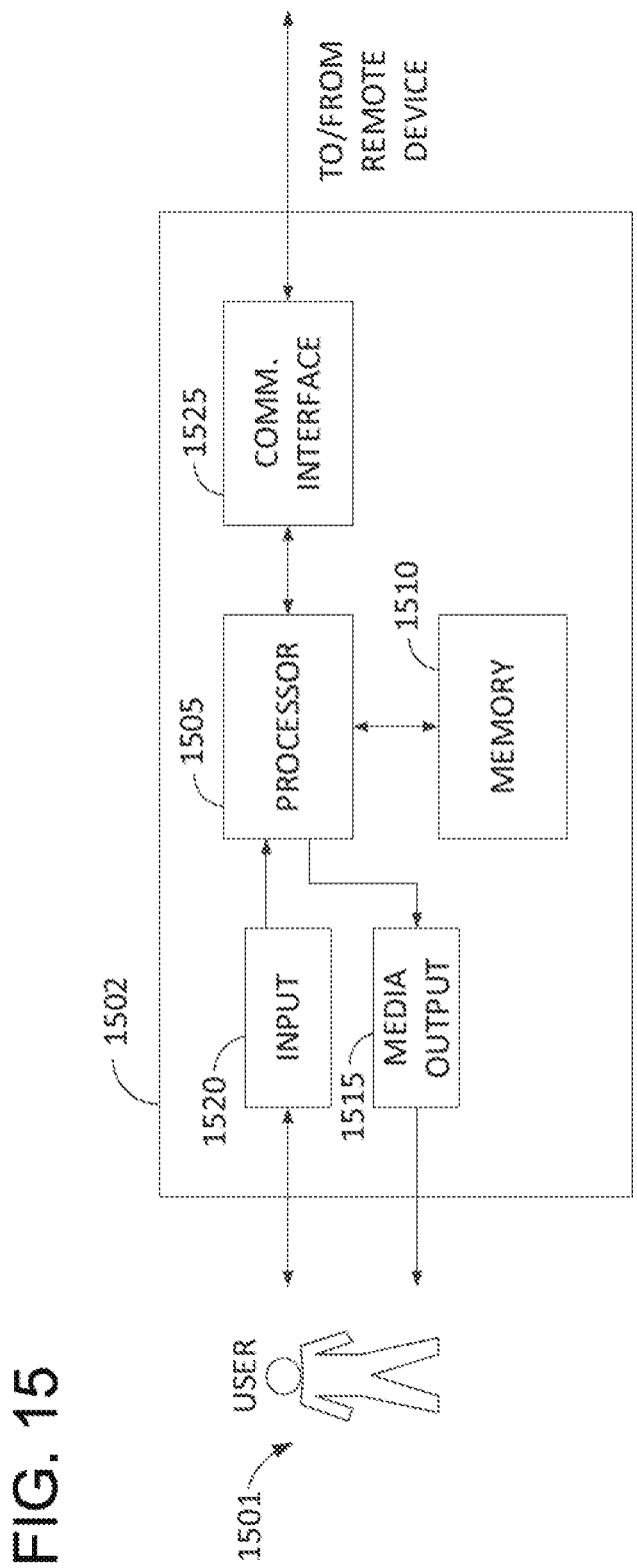
FIG. 15 illustrates an exemplary configuration of a user system operated by a user, such as the homeowner shown in FIG. 1.

FIG. 15 illustrates an exemplary configuration of a user system 1502 operated by a user 1501, such as homeowner 102 (shown in FIG. 1). User system 1502 may include, but is not limited to, client system 1414. In the exemplary embodiment, user system 1502 may include a processor 1505 for executing instructions. In some embodiments, executable instructions may be stored in a memory area 1510. Processor 1505 may include one or more processing units, for example, a multi-core configuration. Memory area 1510 may be any device allowing information, such as executable instructions and/or written works to be stored and/or retrieved. Memory area 1510 may include one or more computer readable media.

User system 1502 may also include at least one media output component 1515 for presenting information to user 1501. Media output component 1515 may be any component capable of conveying information to user 1501. In some embodiments, media output component 1515 may include an output adapter, such as a video adapter and/or an audio adapter. An output adapter may be operatively coupled to processor 1505 and operatively couplable to an output device, such as a display device, a liquid crystal display (LCD), organic light emitting diode (OLED) display, or "electronic ink" display, or an audio output device, a speaker or headphones.

In some embodiments, user system 1502 may include an input device 1520 for receiving input from user 1501. Input device 1520 may include, for example, a keyboard, a pointing device, a mouse, a stylus, a touch sensitive panel, a touch pad, a touch screen, a gyroscope, an accelerometer, a position detector, and/or an audio input device. A single component, such as a touch screen, may function as both an output device of media output component 1515 and input device 1520.

User system 1502 may also include a communication interface 1525, which may be communicatively couplable to a remote device such as building monitoring server 140 (shown in FIG. 1). Communication interface 1525 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 1510 are, for example, computer readable instructions for providing a user interface to user 1501 via media output component 1515 and, optionally, receiving and processing input from input device 1520. A user interface may include, among other possibilities, a web browser and client application. Web browsers enable users, such as user 1501, to display and interact with media and other information typically embedded on a web page or a website from building monitoring server 140. A client application may allow user 1501 to interact with a server application from building monitoring server 140.

In operation, in the exemplary embodiment, user 1501, such as homeowner 102 (shown in FIG. 1), may use user system 1502 to interact with building monitoring system 110 (shown in FIG. 1) using, for example, a web browser.

Figure 16:
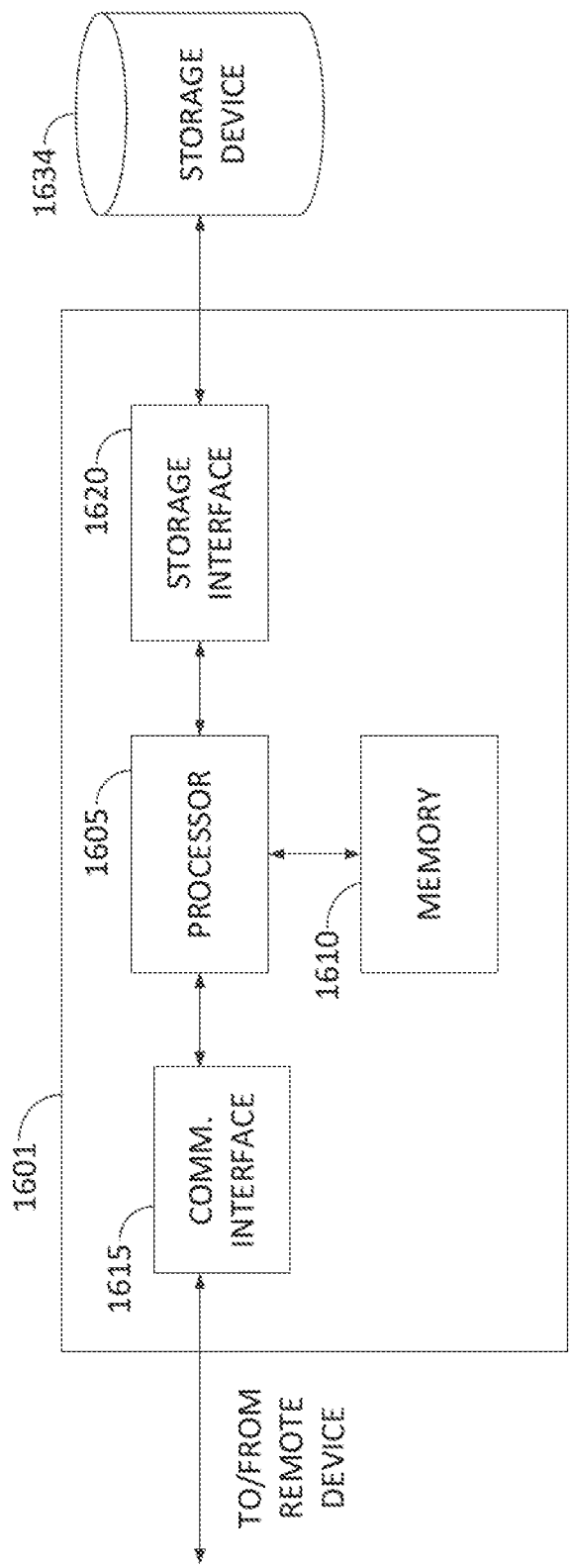
FIG. 16 illustrates an exemplary configuration of a server system such as the building monitoring server shown in FIG. 1.

FIG. 16 illustrates an exemplary configuration of a server system 1601, such as building monitoring server 140 (shown in FIG. 1). Server system 1601 may include, but is not limited to, server 1412 (shown in FIG. 14), database server 1416 (shown in FIG. 14), and/or building monitoring server 140. In the exemplary embodiment, server system 1601 may perform monitoring of building 150 (shown in FIG. 1).

Server system 1601 may include a processor 1605 for executing instructions. Instructions may be stored in a memory area 1610, for example. Processor 1605 may include one or more processing units (e.g., in a multi-core configuration) for executing instructions. The instructions may be executed within a variety of different operating systems on the server system 1601, such as UNIX, LINUX, Microsoft Windows®, etc.

It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 1605 may be operatively coupled to a communication interface 1615 such that server system 1601 is capable of communicating with a remote device, such as a user system or another server system 1601. For example, communication interface 1615 may receive requests from user system 1502 via the Internet, as illustrated in FIG. 9.

Processor 1605 may also be operatively coupled to a storage device 1634. Storage device 1634 may be any computer-operated hardware suitable for storing and/or retrieving data. In some embodiments, storage device 1634 may be integrated in server system 1601.

For example, server system 1601 may include one or more hard disk drives as storage device 1634. In other embodiments, storage device 1634 is external to server system 1601 and may be accessed by a plurality of server systems 1601. For example, storage device 1634 may include multiple storage units such as hard disks or solid state disks in a redundant array of inexpensive disks (RAID) configuration. Storage device 1634 may include a storage area network (SAN) and/or a network attached storage (NAS) system.

In some embodiments, processor 1605 may be operatively coupled to storage device 1634 via a storage interface 1620. Storage interface 1620 may be any component capable of providing processor 1605 with access to storage device 1634. Storage interface 1620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1605 with access to storage device 1634.

Memory area 1610 may include, but are not limited to, random access memory (RAM), such as dynamic RAM (DRAM) or static RAM (SRAM), read-only memory (ROM), erasable programmable read-only memory (EPROM), electrically erasable programmable read-only memory (EEPROM), and/or non-volatile RAM (NVRAM). The above memory types are exemplary only, and are thus not limiting as to the types of memory usable for storage of a computer program.

VIII. Exemplary Method for Monitoring Integrity

In one aspect, a computer-implemented method of monitoring building integrity may be provided. The method include (1) collecting, generating, or receiving, via one or more processors, sensor data from one or more sensors (either directly or indirectly, such as via wireless communication or data transmission) disbursed about a building, the one or more sensors being embedded in building or construction material associated with the building (such as in selected portions of the material or all of a specific type of material); (2) determining or detecting, via the one or more processors, that an abnormal or unexpected condition exists from analysis of the sensor data, the abnormal or unexpected condition indicative that damage to the building is occurring or has occurred; (3) generating, via the one or more processors, a message detailing or associated with the abnormal or unexpected condition; and/or (4) transmitting, via the one or more processors, such as by using wireless communication or data transmission, the message to a mobile device of a home owner (or otherwise causing, via the one or more processors, the message to be displayed on the mobile device of the home owner) to facilitate informing the home owner (i) of the abnormal or unexpected condition within the building exists, (ii) that damage may have occurred to the building, and/or (iii) that remedial actions may be needed to mitigate further damage to the building. The method may include additional, less, or alternate actions, including those discussed elsewhere herein.

For instance, the one or more sensors may be water, moisture, vibration, thermal, or insect sensors, and the damage that occurred to the building may be water, moisture, vibration, thermal, or insect related damage, respectively. The message may include recommendations to the building or home owner, such as contact information for appropriate third party contractors that may be skilled to repair the building and/or mitigate the damage to the building.

The method may further include (i) sending or transmitting, via the one or more processors, the sensor data to an insurance provider remote server; (ii) receiving, via the one or more processors, (a) insurance-related recommendations, (b) insurance policy, premium, discount, or rate updates or changes, and/or (c) prepared or proposed insurance claims associated with the damage to the building from the insurance provider remote server (such as via wireless communication); and/or (iii) causing, via the one or more processors, the (a) insurance-related recommendations, (b) insurance policy, premium, discount, or rate updates or changes (such as updates to home owners or renters insurance, coverages, limits, deductibles, etc.), and/or (c) prepared or proposed insurance claims associated with the damage to the building to be displayed on a mobile device of the building or home owner for their review, approval, and/or modification (such as by transmitting the recommendations or insurance policy information to the mobile device of the building or home owner).

The one or more sensors may wirelessly communicate directly or indirectly with (i) a smart home controller; (ii) a mobile device of a building or home owner; and/or (iii) a remote server, such as an insurance provider remote server; and/or (1) the analysis of the sensor data, and/or (2) the determination to generate alerts and/or recommendations, such as remedial action recommendations, may occur at (a) the one or more sensors themselves, (b) the smart home controller, (c) the mobile device, and/or (d) the remote server.

Determining or detecting, via the one or more processors, an abnormal or unexpected condition exists from analysis of the sensor data may include (1) comparing the sensor data with data associated with expected or normal conditions and/or a baseline of historical or normal data; and/or (2) determining or estimating a severity of the abnormal condition and/or damage to the building, such as by (i) detecting an amount of water, moisture, insects, and/or vibration; (ii) detecting a degree that an expected temperature differs from an actual temperature within or associated with the building; (iii) determining or estimating a length of time that the abnormal condition has existed; and/or (iv) determining or estimating a size of the abnormal condition and/or an area (or square footage) of the building that may be impacted by the abnormal condition and/or that has incurred damage and may be in need of repair. In some embodiments, the expected or normal conditions and/or the baseline historical or normal data may be stored in a local or remote non-transitory memory unit.

The method may also include adjusting, updating, or generating, via one or more processors, insurance policies based upon functionality associated with the sensor embedded in construction material and located throughout an insured home that prevents, alleviates, and/or mitigates damage to the insured home. For instance, discounts or lower premiums on home insurance to insureds that have the embedded sensor functionality that mitigates home damage may be provided and/or calculated by one or more processors.

In another aspect, a method for monitoring a structural system of a building is provided. The method is performed by a building monitoring computer system including a processor and at least one insect sensor positioned at a first position proximate a structural component of the structural system. The at least one insect sensor is configured to detect the presence of an insect infestation proximate to the first position. The method includes (i) receiving a signal from the at least one insect sensor via wireless communication or data transmission indicating the insect infestation, the at least one insect sensor being embedded within construction material associated with the building; (ii) determining the first position within the structure of the building; generating an insect alert indicating the presence of an insect infestation at the first position; and (iii) transmitting an insect alert message to a mobile device of a user of the building monitoring computer system via wireless communication or data transmission, or via a secure electronic communication network, to facilitate informing the user that an abnormal or unexpected condition exists within the building and/or that remedial action may be needed to mitigate damage to the building. The method may include additional, less, or alternate actions, including those discussed elsewhere herein.

In another aspect, a computer-implemented method of monitoring building integrity implemented using a building monitoring computer system may be provided. The building monitoring computer system may include one or more processors. The method may include (i) receiving, by the one or more processors, sensor data from one or more sensors disbursed about a building, the one or more sensors embedded in building material associated with the building, the one or more sensors in at least one of wired and wireless communication with the one or more processors; (ii) detecting, by the one or more processors, that an abnormal condition exists by analyzing the sensor data, wherein the abnormal condition indicates at least one of: damage to the building is about to occur, damage to the building is occurring, and damage to the building has occurred; (iii) generating, by the one or more processors, a message detailing the abnormal condition; and/or (iv) transmitting, by the one or more processors using wireless communication, the message to a mobile device of a user associated with the building, for display of the message on the mobile device, such that the user is informed of the abnormal condition. The method may include additional, less, or alternate actions, including those discussed elsewhere herein.

In another aspect, a computer-implemented method for monitoring construction materials of a building may be provided. The method may be implemented by a building monitoring computer system including one or more processors, a memory, and at least one moisture sensor positioned at a first position within the construction materials of the building and configured to provide a moisture level proximate to the at least one moisture sensor. The method may include identifying a moisture profile associated with the building in the memory, the moisture profile including a profile moisture level associated with the first position, receiving a sample moisture level from the moisture sensor via wireless communication, the moisture sensor being embedded within the construction materials of the building, comparing the sample moisture level to the profile moisture level to generate a moisture level difference, generating a moisture alert based upon determining that the moisture level difference exceeds a pre-determined threshold, and transmitting a moisture alert message to a mobile device of a user of the building monitoring computer system via wireless communication to inform the user of the presence of moisture at the first position. The method may include additional, less, or alternate actions, including those discussed elsewhere herein.

In some embodiments, the moisture alert message may include one or more recommendations to the user, including contact information for at least one third-party contractor located in a region of the building for addressing the detected presence of moisture in the building. The method may further include transmitting, by the one or more processors, the sample moisture level to an insurance provider remote server via wireless communication, receiving, by the one or more processors, at least one of: (a) an insurance-related recommendation, (b) an insurance update, and (c) a pre-populated insurance claim associated with any damage to the building caused by the moisture at the first location, and/or causing, by the one or more processors, the received at least one of (a) insurance-related recommendation, (b) insurance update, and (c) pre-populated insurance claim to be displayed on the mobile device of the user for review. The at least one moisture sensor may wirelessly communicate with at least one of: (i) a smart home controller; (ii) the mobile device of the user; and (iii) a remote server, wherein at least one of (i) the smart home controller; (ii) the mobile device of the user; (iii) the remote server; and (iv) the at least one water sensor may perform at least one of: (1) analysis of the at least one water sensor signal, and (2) determination to generate the moisture alert.

In certain embodiments, the method may further include detecting, by the one or more processors, an abnormal condition of the building. Detecting the abnormal condition may further include analyzing the sample moisture level and comparing the sample moisture level with a baseline historical condition stored in the memory of the building monitoring system. The method may further include determining, by the one or more processors, based on the analyzed sample moisture level, a severity of the abnormal condition, wherein said determining includes at least one of: (i) determining a length of time that the abnormal condition has existed; and (ii) determining a size of an area of the building associated with the first position that is damaged by the abnormal condition. Additionally or alternatively, the method may include transmitting, by the one or more processors, a message to an insurance provider remote server, the message causing the insurance provider remote server to adjust at least one insurance policy associated with the building based upon the at least one moisture sensor being included within building. In some embodiments, the building monitoring system further includes at least one of one or more vibration sensors configured to detect vibration in the building, one or more thermal sensors configured to generate a thermal sample of the building, and/or one or more insect sensors configured to detect insect related damage in the building.

IX. Exemplary Computer System

In one aspect, a computer system configured to monitor building integrity may be provided. The computer system may include one or more processors configured to: (1) collect, generate, or receive sensor data from one or more sensors disbursed about a building, such as via wired or wireless communication or data transmission, the one or more sensors being embedded in building or construction material associated with the building; (2) determine or detect that an abnormal or unexpected condition exists from analysis of the sensor data, the abnormal or unexpected condition indicating that damage to the building is about to occur, is occurring, or has occurred; (3) generate a message detailing or associated with the abnormal or unexpected condition; and/or (4) transmit, via wireless communication or data transmission, the message to a mobile device of a home owner (or otherwise causing, via the one or more processors, the message to be displayed on the mobile device of the home owner, such as by allowing remote or electronic access to the message via a secure website or secure customer virtual account located on or available on the Internet) to facilitate informing the home owner of the abnormal or unexpected condition within the building exists, that damage may have occurred to the building, and/or that remedial actions may be needed to mitigate further damage to the building. The system may include additional, less, or alternate functionality, including that discussed elsewhere herein.

For instance, the one or more sensors may be water, moisture, vibration, thermal, or insect sensors, and the damage that occurred to the building detected by the one or more sensors is water, moisture, vibration, thermal, or insect related damage, respectively. The message may include recommendations to the building or home owner, such as contact information for appropriate third party contractors located in the customers region or area that may be skilled to repair the building and/or mitigate the damage to the building.

The one or more processors may be further configured to: send or transmit the sensor data to an insurance provider remote server via a transceiver; receive (a) an insurance-related recommendation, (b) an insurance policy, premium, discount, or rate update or change, and/or (c) a prepared or proposed insurance claim associated with the damage to the building from the insurance provider remote server (such as via wireless communication or data transmission); and/or cause the (a) insurance-related recommendation, (b) insurance policy, premium, discount, or rate update or change (such as an update to home owners or renters insurance, coverages, limits, deductibles, etc.), and/or (c) prepared or proposed insurance claim associated with the damage to the building to be displayed on a display screen of a mobile device of the building or home owner for their review, approval, and/or modification (such as by transmitting the recommendations or insurance policy information to the mobile device of the building or home owner via wireless communication or data transmission).

The one or more sensors may wirelessly communicate directly or indirectly with (i) a smart home controller; (ii) a mobile device of a building or home owner; and/or (iii) a remote server, such as an insurance provider remote server; and/or (1) analysis of the sensor data, and/or (2) the determination to generate alerts and/or recommendations, such as remedial action recommendations, occurs at (a) the one or more sensors themselves, (b) the smart home controller, (c) the mobile device, and/or (d) the remote server.

Determining or detecting, via the one or more processors, an abnormal or unexpected condition exists from analysis of the sensor data includes the one or more processors comparing the sensor data with data associated with expected or normal conditions and/or a baseline historical or normal data stored in a local or remote non-transitory memory. Additionally or alternatively, determining or detecting, via the one or more processors, an abnormal or unexpected condition exists from analysis of the sensor data may include the one or more processors determining or estimating a severity of the abnormal condition and/or damage to the building, such as by (i) detecting an amount of water, moisture, insects, and/or vibration; (ii) detecting a degree that an expected temperature differs from an actual temperature within or associated with the building; (iii) determining or estimating a length of time that the abnormal condition has existed; and/or (iv) determining or estimating a size of the abnormal condition and/or an area (or square footage) of the building that is impacted by the abnormal condition and/or that has incurred damage and is in need of repair.

The one or more processors may be configured to: adjust, update, or generate insurance policies based upon functionality associated with the sensor embedded in construction material and located throughout an insured home that prevents, alleviates, and/or mitigates damage to the insured home, such as providing discounts or lower premiums on home insurance to insureds that have the embedded sensor functionality that mitigates home damage. Determining or detecting, via the one or more processors, an abnormal or unexpected condition exists from analysis of the sensor data may include the one or more processors determining a type of material that has been damaged, and/or determining a type of corresponding replacement material.

In yet another aspect, a building monitoring computer system (or smart home controller) for monitoring construction materials (such a roofing system and/or the roofing materials thereof) of a building may be provided. The building monitoring computer system may include at least one water sensor positioned at a first position within the construction materials of the building, and/or configured to detect the presence of water near the at least one water sensor. The at least one water sensor may be physically embedded within (and/or attached to) building or construction materials (such as roofing, ceiling, paint, walling, and/or other construction materials, including within cement, paint, shingles, wood, insulation, paneling, floor tiles, bricks, windows, doors, counter tops, cabinets, decking, metal, etc.), such as at the time that the building or construction materials are manufactured. The building monitoring computer system may also include one or more processors communicatively coupled to the at least one water sensor. The one or more processors may be programmed to receive a signal (such as via wireless communication or data transmission) from the at least one water sensor indicating the presence of water. The one or more processors may also be programmed to determine the first position within the roof of the building. The one or more processors may be further programmed to generate a water alert indicating the presence of water at the first position. The one or more processors may also be programmed to transmit a water alert message (and/or recommendations) to a mobile device of a user of the building monitoring computer system to inform the user of the presence of water at the first position, and/or transmit associated information to (and/or receive information from) an insurance provider remote server to facilitate insurance related activities (e.g., initiate remedial actions and/or home repair, update insurance policies, estimate replacement or repair costs, and/or prepare potential insurance claims for user review and approval). The building monitoring computer system may include additional, fewer, or alternate components and/or functionality, including that discussed elsewhere herein.

For instance, the water alert message may include one or more recommendations to the user, including contact information for at least one third-party contractor located in a region of the building for addressing the detected presence of water in the building. Additionally or alternatively, the one or more processors may be further programmed to: (i) transmit the at least one water sensor signal to an insurance provider remote server via wireless communication; (ii) receive, from the insurance provider remote server, at least one of: (a) an insurance-related recommendation, (b) an insurance policy update, and (c) a pre-populated insurance claim associated with any damage to the building caused by the water at the first location; and/or (iii) cause the received at least one of (a) insurance-related recommendation, (b) insurance policy update, and (c) pre-populated insurance claim to be displayed on the mobile device of the user for review. In some embodiments, the building monitoring computer system may further include at least one of one or more vibration sensors configured to detect vibration in the building, one or more thermal sensors configured to generate a thermal sample of the building, and/or one or more insect sensors configured to detect insect related damage in the building.

In some embodiments, the at least one water sensor may wirelessly communicate with at least one of: (i) a smart home controller; (ii) the mobile device of the user; and (iii) a remote server. At least one of (i) the smart home controller; (ii) the mobile device of the user; (iii) the remote server; and (iv) the at least one water sensor may (1) analyze the at least one water sensor signal, and/or (2) make a determination to generate the water alert. Additionally or alternatively, the one or more processors may be further programmed to detect an abnormal condition of the building by analyzing the at least one water sensor signal, and comparing the at least one water sensor signal with a baseline historical condition stored in a memory of the building monitoring system. The one or more processors may be programmed to determine, based on the analyzed water sensor signal, a severity of the abnormal condition, wherein the determination includes at least one of: (i) determining a length of time that the abnormal condition has existed; and/or (ii) determining a size of an area of the building associated with the first position that is damaged by the abnormal condition. The one or more processors may further determine (i) a type of damaged material at the first position, and/or (ii) a type of replacement material to replace the damaged material. In some embodiments, the one or more processors may be further programmed to transmit a message to an insurance provider remote server, the message causing the insurance provider remote server to adjust at least one insurance policy associated with the building based upon the at least one water sensor being included within building.

In another aspect, a building monitoring computer system for monitoring a thermal system of a building may be provided. The building monitoring computer system may include a memory including a thermal profile of the building. The thermal profile may include a plurality of profile elements. Each profile element may include a profile internal temperature, at least one profile external temperature, and/or a profile utility run time associated with a furnace and/or an air conditioning device associated with the building. The building monitoring computer system may also include at least one external thermal sensor configured to provide external environment temperature data of an external environment proximate the building. The building monitoring computer system may further include one or more processors communicatively coupled to the at least one external thermal sensor. The one or more processors may be programmed to (i) receive a plurality of temperature samples from the at least one external thermal sensor during a sample time period (such as via wireless communication or data transmission); (ii) determine one of a minimum external temperature and a maximum external temperature for the external environment during the sample time period; (iii) determine a sample utility run time associated with the furnace and/or the air conditioning device during the sample time period; (iv) determine a sample internal temperature during the sample time period; (v) identify the corresponding profile element from the thermal profile based at least in part on the sample internal temperature, and one of the minimum external temperature and the maximum external temperature; (vi) compare the sample utility run time to the identified profile utility run time to generate a utility run time difference; (vii) determine that the utility run time difference exceeds a pre-determined threshold; (viii) generate a thermal alert based upon determining that the run time difference exceeds the pre-determined threshold; and/or (ix) transmit a thermal alert message and/or recommendations to a mobile device of a user of the building monitoring computer system. The one or more processors may also direct communication with an insurance provider remote server to provide insurance-related recommendations to the user (or to the user's mobile device) and/or update insurance policies associated with the building. The building monitoring computer system may include additional, fewer, or alternate components and/or functionality, including that discussed elsewhere herein.

In yet another aspect, a building monitoring computer system for monitoring construction materials of a building may be provided. The system may include at least one moisture sensor positioned at a first position within the construction materials of the building and configured to provide a moisture level proximate to the at least one moisture sensor, the at least one moisture sensor being embedding within the construction materials of the building. The system may also include a memory including a moisture profile of the building, the moisture profile including a profile moisture level associated with the first position and one or more processors communicatively coupled to the at least one moisture sensor. The one or more processors may be programmed to receive a sample moisture level from the at least one moisture sensor via wireless communication, compare the sample moisture level to the profile moisture level to generate a moisture level difference, generate a moisture alert based upon determining that the moisture level difference exceeds a pre-determined threshold, and transmit a moisture alert message to a mobile device of a user of the building monitoring computer system via wireless communication to inform the user of the presence of moisture at the first position. The building monitoring computer system may include additional, fewer, or alternate components and/or functionality, including that discussed elsewhere herein.

For instance, the moisture alert message may include one or more recommendations to the user, including contact information for at least one third-party contractor located in a region of the building for addressing the detected presence of moisture in the building. Additionally or alternatively, the one or more processors may be further programmed to: (i) transmit the sample moisture level to an insurance provider remote server via wireless communication; (ii) receive, from the insurance provider remote server, at least one of: (a) an insurance-related recommendation, (b) an insurance policy update, and (c) a pre-populated insurance claim associated with any damage to the building caused by the moisture at the first location; and/or (iii) cause the received at least one of (a) insurance-related recommendation, (b) insurance policy update, and (c) pre-populated insurance claim to be displayed on the mobile device of the user for review. In some embodiments, the building monitoring computer system may further include at least one of one or more vibration sensors configured to detect vibration in the building, one or more thermal sensors configured to generate a thermal sample of the building, and/or one or more insect sensors configured to detect insect related damage in the building.

In some embodiments, the at least one moisture sensor may wirelessly communicate with at least one of: (i) a smart home controller; (ii) the mobile device of the user; and (iii) a remote server. At least one of (i) the smart home controller; (ii) the mobile device of the user; (iii) the remote server; and (iv) the at least one moisture sensor may (1) analyze the moisture sample level, and/or (2) make a determination to generate the moisture alert. Additionally or alternatively, the one or more processors may be further programmed to detect an abnormal condition of the building by analyzing the sample moisture level, and comparing the sample moisture level with a baseline historical condition stored in a memory of the building monitoring system. The one or more processors may be programmed to determine, based on the analyzed sample moisture level, a severity of the abnormal condition, wherein the determination includes at least one of: (i) determining a length of time that the abnormal condition has existed; and/or (ii) determining a size of an area of the building associated with the first position that is damaged by the abnormal condition. The one or more processors may further determine (i) a type of damaged material at the first position, and/or (ii) a type of replacement material to replace the damaged material. In some embodiments, the one or more processors may be further programmed to transmit a message to an insurance provider remote server, the message causing the insurance provider remote server to adjust at least one insurance policy associated with the building based upon the at least one water sensor being included within building.

In yet another aspect, a building monitoring computer system for monitoring a structural system of a building may be provided. The system may include at least one insect sensor positioned at a first position proximate a structural component of the structural system and configured to detect the presence of an insect infestation proximate to the first position, the at least one insect sensor being embedded in construction materials of the building and one or more processors communicatively coupled to the at least one insect sensor. The one or more processors may be programmed to receive a signal from the at least one insect sensor indicating the insect infestation via wireless communication, determine the first position within the construction materials of the building, generate an insect alert indicating the presence of an insect infestation at the first position, and transmit an insect alert message to a mobile device of a user of the building monitoring computer system via wireless communication to inform the user of the presence of insects at the first position.

In yet another aspect, a building monitoring computer system for monitoring a structural system of a building may be provided. The building monitoring computer system may include a memory including a vibration profile of the building. The vibration profile may include a maximum profile vibration level at a first position proximate a structural component of the structural system. The maximum profile vibration level may represent a level of vibration likely to cause damage to the structural component proximate to the first position. The building monitoring computer system may also include at least one vibration sensor positioned at the first position and configured to detect the presence of vibrations proximate to the first position. The at least one vibration sensor may be physically embedded within building or construction materials of the building, and/or selected portions thereof. The building monitoring computer system may further include one or more processors communicatively coupled to the at least one vibration sensor. The one or more processors may be programmed to receive a signal from the at least one vibration sensor including a sample vibration level proximate to the first position (such as via wireless communication or data transmission), and/or compare the sample vibration level to the maximum profile vibration level. The one or more processors may further be programmed to determine that the sample vibration level exceeds the maximum profile vibration level, and/or generate a vibration alert indicating that the structural component near the first position has experienced a potentially damaging vibration level. The one or more processors may also be programmed to (i) transmit a vibration alert message and/or remedial or mitigating recommendations to a mobile device of a user of the building monitoring computer system, and/or (ii) wirelessly communicate with a remote server to provide insurance-related recommendations and/or policy updates based upon the information gathered by the at least vibration sensor. The building monitoring computer system may include additional, fewer, or alternate components and/or functionality, including that discussed elsewhere herein.

X. Exemplary Insurance-Related Functionality

In another aspect, a computer-implemented method of monitoring building integrity and/or mitigating home damage may be provided. The method may include (1) collecting, generating, or receiving, via one or more processors (such as processors or servers associated with an insurance provider), sensor data from one or more sensors (either directly or indirectly) that are disbursed about a building, the one or more sensors being embedded in building or construction material associated with the building; (2) determining or detecting, via the one or more processors, an abnormal or unexpected condition exists from analysis of the sensor data, the abnormal or unexpected condition indicative that damage to the building is occurring or has occurred; (3) generating, via the one or more processors, an insurance-related message detailing or associated with the abnormal or unexpected condition; and/or (4) transmitting, via the one or more processors, such as by using wireless communication or data transmission, the insurance-related message to a mobile device of a home owner (or otherwise causing, via the one or more processors, the insurance-related message to be displayed on the mobile device of the home owner) to facilitate informing the home owner of the abnormal or unexpected condition within the building exists, that damage may have occurred to the building, and/or that remedial actions may be needed to mitigate further damage to the building. The method may include additional, less, or alternate functionality, including that discussed elsewhere herein.

For instance, the one or more sensors may be water, moisture, vibration, thermal, or insect sensors, and the sensor data may detail or be associated with water, moisture, vibration, thermal, or insect related damage to the building, respectively. The insurance-related message may include an alert of potential roof, structural, foundation, or other damage to the building, and/or recommendations to the building or home owner, such as contact information for appropriate third party contractors that may be skilled to, or provide services that, repair the building and/or mitigate the damage to the building.

The insurance-related message may include an update to a home owners or renters insurance policy, such as a change in premium, discount, or rate based upon the sensor data received for an insurance customer's review or approval. The insurance-related message may include a proposed insurance claim for an insurance customer's review, modification, or approval based upon the sensor data received and/or an estimated amount or extent of home damage based upon computer analysis of the sensor data.

Additionally or alternatively, the method may include adjusting, updating, and/or generating, via one or more processors, insurance policies based upon functionality associated with the sensors embedded in construction material and located throughout an insured home that prevents, alleviates, and/or mitigates damage to the insured home. For instance, discounts or lower premiums on home insurance for insureds that have the embedded sensor functionality that mitigates home damage may be calculated by one or more processors and provided to insureds.

XI. Exemplary Roof System & Method

In one aspect, a building monitoring computer system for monitoring a roofing system of a building may be provided.

The building monitoring computer system may include (1) at least one water (or moisture) sensor positioned at a first position within the roofing system of the building and configured to detect the presence of water near the at least one water sensor, the at least one water sensor being embedded within roofing or other construction material associated with the building; and (2) one or more processors communicatively coupled to the at least one water sensor, wherein the one or more processors are programmed to: (i) receive a signal from the at least one water sensor indicating the presence of water via wireless communication or data transmission; (ii) determine the first position within the roof of the building; (iii) generate a water alert indicating the presence of water at the first position; and/or transmit a water alert message to a mobile device of a user of the building monitoring computer system via wireless communication or data transmission and/or via a secure website or a secure customer virtual account (requiring login credentials) located on the Internet to facilitate alleviating or mitigating water damage to the building and/or informing the user that remedial actions may be necessary to prevent further water damage to the building. The building system may include additional, less, or alternate functionality, including that discussed elsewhere herein.

For instance, the water alert message may include one or more recommendations to the user (e.g., a building or home owner, or building resident or other insured), including contact information for appropriate third party contractors located in the customers region or area that are skilled to repair the building and/or otherwise mitigate the damage to the building.

The one or more processors may be further configured to: send or transmit the sensor data to an insurance provider remote server or associated transceiver via wireless communication or data transmission; receive (a) an insurance-related recommendation, (b) an insurance policy, premium, discount, or rate update or change, and/or (c) a prepared or proposed insurance claim associated with the damage to the building from the insurance provider remote server or transceiver (such as via wireless communication or data transmission); and/or cause the (a) insurance-related recommendation, (b) insurance policy, premium, discount, or rate update or change (such as an update to home owners or renters insurance, coverages, limits, deductibles, etc.), and/or (c) prepared or proposed insurance claim associated with the damage to the building to be displayed on a mobile device of the building or home owner for their review, approval, and/or modification (such as by transmitting the recommendations or insurance policy information to the mobile device of the building or home owner via wireless communication or data transmission, or providing accessing to such information via a secure website or a secure virtual account available on the Internet).

The water sensor(s) may wirelessly communicate directly or indirectly with (i) a smart home controller; (ii) a mobile device of a building or home owner; and/or (iii) a remote server, such as an insurance provider remote server; and (1) analysis of the sensor data, and/or (2) the determination to generate at least one alert and/or recommendation, such as a remedial action recommendation, occurs at (a) the at least one water sensor itself, (b) the smart home controller, (c) the mobile device, and/or (d) the remote server.

Determining or detecting, via the one or more processors, an abnormal or unexpected condition exists from analysis of the sensor data (such as detecting water, or detecting unexpected water or moisture) may include the one or more processors comparing the sensor data with data associated with expected or normal conditions and/or a baseline historical or normal data, or data representing expected conditions. The expected or normal conditions and/or the baseline historical or normal data (or data representing normal conditions) may be stored in a local or remote memory. Determining or detecting, via the one or more processors, an abnormal or unexpected condition exists from analysis of the sensor data may include the one or more processors determining or estimating a severity of the abnormal condition and/or damage to the building, such as by (i) determining or estimating a length of time that the abnormal condition has existed; and/or (ii) determining or estimating a size of the abnormal condition and/or an area (or square footage) of the building that is impacted by the abnormal condition and/or that has incurred damage and is in need of repair. Additionally or alternatively, determining or detecting, via the one or more processors, an abnormal or unexpected condition exists from analysis of the sensor data includes the one or more processors determining a type of damaged material and a type of replacement material to replace the damaged material.

The one or more processors may be configured to: adjust, update, or generate insurance policies based upon functionality associated with the at least one water (or other type of) sensor embedded in construction material and located throughout an insured home that prevents, alleviates, and/or mitigates damage to the insured home, such as providing discounts or lower premiums on home insurance to insureds that have the embedded sensor functionality that mitigates home damage. The building monitoring computer system further comprising one or more vibration, thermal, or insect sensors, and the damage that occurred to the building detected by those sensors is vibration, thermal, or insect related damage, respectively.

In another aspect, a computer-implemented method for monitoring a roofing system of a building may be provided. The method may be performed or implemented by a building monitoring computer system including one or more processors and at least one water sensor positioned at a first position within the roofing system of the building and configured to detect the presence of water near the at least one water sensor. The method may include: (1) receiving a signal from the at least one water sensor indicating the presence of water via wireless communication or data transmission, the at least one water sensor being embedded within roofing or other construction material associated with the building; (2) determining the first position within the roof of the building; (3) generating a water alert indicating the presence of water at the first position; and/or (4) transmitting a water alert message to a mobile device of a user of the building monitoring computer system via wireless communication and/or data transmission, and/or via a secure website or a secure virtual account (requiring login credentials) available on the Internet, to facilitate informing the user that an abnormal or unexpected condition exists within the building and/or that remedial action may be needed to mitigate damage to the building. The method may include additional, less, or alternate functionality, and may be implemented via one or more local or remote processors (e.g., mobile devices, remote servers, smart home controllers, etc.), and via computer-executable instructions stored on non-transitory computer-readable medium or media.

For instance, the water alert message may include one or more recommendations to the user (e.g., a building or home owner, or another insured), including contact information for appropriate third party contractors located in the customers region or area that are skilled to repair the building and/or otherwise mitigate the damage to the building.

The one or more processors may be further configured to: send or transmit the sensor data to an insurance provider remote server or associated transceiver via wireless communication or data transmission; receive (a) an insurance-related recommendation, (b) an insurance policy, premium, discount, or rate update or change, and/or (c) a prepared or proposed insurance claim associated with the damage to the building from the insurance provider remote server or transceiver (such as via wireless communication or data transmission); and/or cause the (a) insurance-related recommendation, (b) insurance policy, premium, discount, or rate update or change (such as an update to home owners or renters insurance, coverages, limits, deductibles, etc.), and/or (c) prepared or proposed insurance claim associated with the damage to the building to be displayed on a mobile device of the building or home owner for their review, approval, and/or modification (such as by transmitting the recommendations or insurance policy information to the mobile device of the building or home owner via wireless communication or data transmission, or providing accessing to such information via a secure website or a secure virtual account available on the Internet).

The at least one water sensor may wirelessly communicate directly or indirectly with (i) a smart home controller; (ii) a mobile device of a building or home owner; and/or (iii) a remote server, such as an insurance provider remote server; and (1) analysis of the sensor data, and/or (2) the determination to generate at least one alert and/or recommendation, such as a remedial action recommendation, occurs at (a) the at least one water sensor itself, (b) the smart home controller, (c) the mobile device, and/or (d) the remote server.

Determining or detecting, via the one or more processors, an abnormal or unexpected condition exists from analysis of the sensor data may include the one or more processors comparing the sensor data with data associated with expected or normal conditions and/or a baseline historical or normal data, or data representing expected conditions. Determining or detecting, via the one or more processors, an abnormal or unexpected condition exists from analysis of the sensor data may include the one or more processors determining or estimating a severity of the abnormal condition and/or damage to the building, such as by (i) determining or estimating a length of time that the abnormal condition has existed; and/or (ii) determining or estimating a size of the abnormal condition and/or an area (or square footage) of the building that is impacted by the abnormal condition and/or that has incurred damage and is in need of repair. Additionally or alternatively, determining or detecting, via the one or more processors, an abnormal or unexpected condition exists from analysis of the sensor data may include the one or more processors determining a type of material that has been damaged, and/or determining a type of corresponding replacement material.

The one or more processors may be configured to: adjust, update, or generate insurance policies based upon functionality associated with the at least one water (or other type of) sensor embedded in construction material and located throughout an insured home that prevents, alleviates, and/or mitigates damage to the insured home, such as providing discounts or lower premiums on home insurance to insureds that have the embedded sensor functionality that mitigates home damage. The building monitoring computer system may further include one or more vibration, thermal, or insect sensors, and the damage that occurred to the building detected by the various sensors is vibration, thermal, or insect related damage, respectively.

XII. Exemplary Foundation System & Method

In one aspect, a building monitoring computer system for monitoring a foundation system of a building may be provided. The building monitoring computer system may include: (1) at least one moisture (or water) sensor positioned at a first position within the foundation system of the building and configured to provide a moisture level proximate to the at least one moisture sensor, the at least one moisture sensor being embedding within cement or other construction material associated with the building; (2) a memory including a moisture profile of the building, the moisture profile including a profile moisture level associated with the first position; and/or (3) one or more processors communicatively coupled to the at least one moisture sensor, wherein the one or more processors are programmed to: (i) receive a sample moisture level from the moisture sensor via wireless communication or data transmission; (ii) compare the sample moisture level to the profile moisture level to generate a moisture level difference; (iii) generate a moisture alert based upon determining that the moisture level difference exceeds a pre-determined threshold; and/or (iv) transmit a moisture alert message to a mobile device of a user of the building monitoring computer system via wireless communication or data transmission, and/or via a secure website or a secure virtual account located, or available, on the Internet to facilitate informing the user that an abnormal or unexpected condition exists within the building and/or that remedial action may be needed to mitigate damage to the building. The system may include additional, less, or alternative functionality, including that discussed elsewhere herein.

For instance, the moisture alert message may include one or more recommendations to the user (e.g., a building or home owner, or building resident or other insured), including contact information for appropriate third party contractors located in the customers region or area that are skilled to repair the building and/or otherwise mitigate the damage to the building.

The one or more processors may be further configured to: send or transmit the sensor data, from a transceiver, to an insurance provider remote server or associated transceiver; receive (a) an insurance-related recommendation, (b) an insurance policy, premium, discount, or rate update or change, and/or (c) a prepared or proposed insurance claim associated with the damage to the building from the insurance provider remote server or transceiver (such as via wireless communication or data transmission); and/or cause the (a) insurance-related recommendation, (b) insurance policy, premium, discount, or rate update or change (such as an update to home owners or renters insurance, coverages, limits, deductibles, etc.), and/or (c) prepared or proposed insurance claim associated with the damage to the building to be displayed on a display screen of a mobile device of the building or home owner for their review, approval, and/or modification (such as by transmitting the recommendations or insurance policy information to the mobile device of the building or home owner via wireless communication or data transmission, or providing accessing to such information via a secure website or a secure virtual account available on the Internet).

The at least one moisture sensor wirelessly communicates directly or indirectly with (i) a smart home controller; (ii) a mobile device of a building or home owner; and/or (iii) a remote server, such as an insurance provider remote server; and/or (1) analysis of the sensor data, and/or (2) the determination to generate at least one alert and/or recommendation, such as a remedial action recommendation, occurs at (a) the at least one moisture sensor itself, (b) the smart home controller, (c) the mobile device, and/or (d) the remote server.

Determining or detecting, via the one or more processors, an abnormal or unexpected condition exists from analysis of the sensor data (such as detecting moisture or unexpected moisture) may include the one or more processors comparing the sensor data with data associated with expected or normal conditions and/or a baseline historical or normal data, or data representing expected conditions, that is stored in a local or remote non-transitory computer-readable medium or media. Determining or detecting, via the one or more processors, an abnormal or unexpected condition exists from analysis of the sensor data may include the one or more processors determining or estimating a severity of the abnormal condition and/or damage to the building, such as by (i) determining or estimating a length of time that the abnormal condition has existed; and/or (ii) determining or estimating a size of the abnormal condition and/or an area (or square footage) of the building that is impacted by the abnormal condition and/or that has incurred damage and is in need of repair. Additionally or alternatively, determining or detecting, via the one or more processors, an abnormal or unexpected condition exists from analysis of the sensor data includes the one or more processors determining a type of damaged material and a type of replacement material to replace the damaged material.

The one or more processors may be configured to: adjust, update, or generate insurance policies based upon functionality associated with the at least one moisture (or other type of) sensor embedded in construction material and located throughout an insured home that prevents, alleviates, and/or mitigates damage to the insured home, such as by providing discounts or lower premiums on home insurance to insureds that have the embedded sensor functionality that mitigates home damage. The building monitoring computer system further comprising one or more vibration, thermal, or insect sensors, and the damage that occurred or is occurring to the building detected by the various sensors is vibration, thermal, or insect related damage, respectively.

In another aspect, a computer-implemented method for monitoring a foundation system of a building may be provided. The method may be performed by a building monitoring computer system including one or more processors, a memory, and at least one moisture (or water) sensor positioned at a first position within the foundation system of the building and configured to provide a moisture level proximate to the at least one moisture sensor. The method may include (1) identifying the moisture profile in the memory, the moisture profile including a moisture profile of the building, the moisture profile including a profile moisture level associated with the first position; (2) receiving a sample moisture level from the moisture sensor via wireless communication or data transmission, the moisture sensor being embedded within cement or other construction material associated with the building; (3) comparing the sample moisture level to the profile moisture level to generate a moisture level difference; (4) generating a moisture alert based upon determining that the moisture level difference exceeds a pre-determined threshold; and/or (5) transmitting a moisture alert message to a mobile device of a user of the building monitoring computer system via wireless communication or data transmission, and/or via a secure website or a secure customer virtual account (requiring login credentials) available on the Internet to facilitate informing the user that an abnormal or unexpected condition exists within the building and/or that remedial action may be needed to mitigate damage to the building. The method may include additional, less, or alternate actions, including that discussed elsewhere herein, and may be implemented via one or more local or remote processors, and/or via computer-executable instructions stored on non-transitory computer-readable medium or media.

For instance, the message may include one or more recommendations to the user (e.g., a building or home owner, or another insured), including contact information for appropriate third party contractors located in the customers region or area that are skilled to repair the building and/or otherwise mitigate the damage to the building.

The one or more processors may be further configured to: send or transmit the sensor data, from a transceiver, to an insurance provider remote server or associated transceiver via wireless communication or data transmission; receive (a) an insurance-related recommendation, (b) an insurance policy, premium, discount, or rate update or change, and/or (c) a prepared or proposed insurance claim associated with the damage to the building from the insurance provider remote server or transceiver (such as via wireless communication or data transmission); and/or cause the (a) insurance-related recommendation, (b) insurance policy, premium, discount, or rate update or change (such as an update to home owners or renters insurance, coverages, limits, deductibles, etc.), and/or (c) prepared or proposed insurance claim associated with the damage to the building to be displayed on a mobile device of the building or home owner for their review, approval, and/or modification (such as by transmitting the recommendations or insurance policy information to the mobile device of the building or home owner via wireless communication or data transmission, or providing accessing to such information via a secure website or a secure virtual account requiring login credentials available on the Internet).

The at least one moisture sensor may wirelessly communicate directly or indirectly with (i) a smart home controller; (ii) a mobile device of a building or home owner; and/or (iii) a remote server, such as an insurance provider remote server; and/or (1) analysis of the sensor data, and/or (2) the determination to generate at least one alert and/or recommendation, such as a remedial action recommendation, occurs at (a) the at least one water sensor itself, (b) the smart home controller, (c) the mobile device, and/or (d) the remote server.

Determining or detecting, via the one or more processors, an abnormal or unexpected condition exists from analysis of the sensor data may include the one or more processors comparing the sensor data with data associated with expected or normal conditions and/or a baseline historical or normal data, or data representing expected conditions, stored in a local or remote non-transitory memory unit. Determining or detecting, via the one or more processors, an abnormal or unexpected condition exists from analysis of the sensor data includes the one or more processors determining or estimating a severity of the abnormal condition and/or damage to the building, such as by (i) determining or estimating a length of time that the abnormal condition has existed; and/or (ii) determining or estimating a size of the abnormal condition and/or an area (or square footage) of the building that is impacted by the abnormal condition and/or that has incurred damage and is in need of repair. Additionally or alternatively, determining or detecting, via the one or more processors, an abnormal or unexpected condition exists from analysis of the sensor data includes the one or more processors determining a type of material that has been damaged, and/or determining a type of corresponding replacement material.

The one or more processors may be configured to: adjust, update, or generate insurance policies based upon functionality associated with the at least one moisture (or other type of) sensor embedded in construction material and located throughout an insured home that prevents, alleviates, and/or mitigates damage to the insured home, such as providing discounts or lower premiums on home insurance to insureds that have the embedded sensor functionality that mitigates home damage. The building monitoring computer system may further include one or more vibration, thermal, or insect sensors, and the damage that occurred to the building is vibration, thermal, or insect related damage, respectively.

XIV. Additional Features

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Heat transfer may be described herein in terms of "heat" or "cold" "moving" in a particular direction (e.g., from interior 430 to external environment 406 (both shown in FIG. 4a), but it should be understood that "heat" or "cold"

are relative terms, and thermal change is described in terms of "motion" for ease of discussion. For example, "heat escaping" from an area may be stated as "cold entering" into an area.

The patent claims at the end of this patent application are not intended to be construed under 35 U.S.C. § 112(f) unless traditional means-plus-function language is expressly recited, such as "means for" or "step for" language being explicitly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A building monitoring computer system for monitoring construction materials of a building, the building monitoring computer system including:
   a moisture sensor positioned at a first position of the building and configured to provide a moisture level, the moisture sensor being embedded within the construction materials of the building;
   a memory including a profile moisture level associated with the first position; and
   one or more processors communicatively coupled to the moisture sensor, wherein the one or more processors are programmed to:
      compare a sample moisture level received from the moisture sensor via wireless communication to the profile moisture level to generate a moisture level difference;
      generate a moisture alert based upon determining that the moisture level difference exceeds a pre-determined threshold; and
      transmit a moisture alert message to a mobile device of a user of the building monitoring computer system via wireless communication to alert the user of a presence of moisture at the first position.

2. The building monitoring computer system of claim 1, wherein the construction materials include a foundation system of the building.

3. The building monitoring computer system of claim 1, wherein the moisture alert message includes one or more recommendations to the user, including contact information for at least one third-party contractor located in a region of the building for addressing the detected presence of moisture in the building.

4. The building monitoring computer system of claim 1, the one or more processors further programmed to:
   transmit the sample moisture level to an insurance provider remote server via wireless communication;
   receive, from the insurance provider remote server, at least one of: (a) an insurance-related recommendation, (b) an insurance policy update, and (c) a pre-populated insurance claim associated with any damage to the building caused by moisture at the first position; and
   cause the received at least one of (a) insurance-related recommendation, (b) insurance update, and (c) pre-populated insurance claim to be displayed on the mobile device of the user for review.

5. The building monitoring computer system of claim 1, wherein the moisture sensor wirelessly communicates with at least one of (i) a smart home controller; (ii) the mobile device of the user; and (iii) a remote server, and
   wherein at least one of (i) the smart home controller; (ii) the mobile device of the user; (iii) the remote server; and (iv) the moisture sensor performs at least one of: (1) analysis of the sample moisture level, and (2) determination to generate the moisture alert.

6. The building monitoring computer system of claim 1, wherein the one or more processors are further programmed to detect an abnormal condition of the building by:
   analyzing the sample moisture level; and
   comparing the sample moisture level with a baseline historical condition stored in a memory of the building monitoring computer system, the baseline historical condition including a plurality of moisture sensor samples collected by the one or more processors during a baseline time.

7. The building monitoring computer system of claim 6, wherein the one or more processors are further programmed to determine, based on the analyzed sample moisture level, a severity of an abnormal condition, wherein the determination includes at least one of: (i) determining a length of time that the abnormal condition has existed; and (ii) determining a size of an area of the building associated with the first position that is damaged by the abnormal condition.

8. The building monitoring computer system of claim 1, wherein the one or more processors are further programmed to determine: (i) a type of damaged material at the first position, and (ii) a type of replacement material to replace the damaged material.

9. The building monitoring computer system of claim 1, the one or more processors further programmed to:
   transmit a message to an insurance provider remote server, the message causing the insurance provider remote server to adjust at least one insurance policy associated with the building based upon the moisture sensor being included within the building.

10. The building monitoring computer system of claim 1, further comprising at least one of:
    one or more vibration sensors configured to detect vibration in the building;
    one or more thermal sensors configured to generate a thermal sample of the building; and
    one or more insect sensors configured to detect insect related damage in the building.

11. A computer-implemented method for monitoring construction materials of a building, said method implemented by a building monitoring computer system including one or more processors, a memory, and a moisture sensor positioned at a first position of the building and configured to provide a moisture level, the method comprising:
   receiving a sample moisture level from the moisture sensor via wireless communication, the moisture sensor being embedded within the construction materials of the building;
   comparing the sample moisture level to a profile moisture level associated with the first position to generate a moisture level difference;
   generating a moisture alert based upon determining that the moisture level difference exceeds a pre-determined threshold; and
   transmitting a moisture alert message to a mobile device of a user of the building monitoring computer system via wireless communication to alert the user of a presence of moisture at the first position.

12. The computer-implemented method of claim 11, wherein the moisture alert message includes one or more recommendations to the user, including contact information for at least one third-party contractor located in a region of the building for addressing the detected presence of moisture in the building.

13. The computer-implemented method of claim 11 further comprising:
 transmitting, by the one or more processors, the sample moisture level to an insurance provider remote server via wireless communication;
 receiving, by the one or more processors, at least one of: (a) an insurance-related recommendation, (b) an insurance update, and (c) a pre-populated insurance claim associated with any damage to the building caused by the moisture at the first position; and
 causing, by the one or more processors, the received at least one of (a) insurance-related recommendation, (b) insurance update, and (c) pre-populated insurance claim to be displayed on the mobile device of the user for review.

14. The computer-implemented method of claim 11, wherein the moisture sensor wirelessly communicates with at least one of: (i) a smart home controller; (ii) the mobile device of the user; and (iii) a remote server, and
 wherein at least one of (i) the smart home controller; (ii) the mobile device of the user; (iii) the remote server; and (iv) the moisture sensor performs at least one of: (1) analysis of the sample moisture level, and (2) determination to generate the moisture alert.

15. The computer-implemented method of claim 11, further comprising detecting, by the one or more processors, an abnormal condition of the building, said detecting comprising:
 analyzing the sample moisture level; and
 comparing the sample moisture level with a baseline historical condition stored in the memory of the building monitoring computer system, the baseline historical condition including a plurality of moisture sensor samples collected by the one or more processors during a baseline time.

16. The computer-implemented method of claim 15, further comprising determining, by the one or more processors, based on the analyzed sample moisture level, a severity of the abnormal condition, wherein said determining includes at least one of: (i) determining a length of time that the abnormal condition has existed; and (ii) determining a size of an area of the building associated with the first position that is damaged by the abnormal condition.

17. The computer-implemented method of claim 11, further comprising transmitting, by the one or more processors, a message to an insurance provider remote server, the message causing the insurance provider remote server to adjust at least one insurance policy associated with the building based upon the moisture sensor being included within the building.

18. The computer-implemented method of claim 11, the building monitoring computer system further comprising at least one of:
 one or more vibration sensors configured to detect vibration in the building;
 one or more thermal sensors configured to generate a thermal sample of the building; and
 one or more insect sensors configured to detect insect related damage in the building.

19. A building monitoring computer system for monitoring a structural system of a building, the building monitoring computer system including:
 an insect sensor positioned at a first position proximate a structural component of the structural system and configured to detect a presence of an insect infestation proximate to the first position, the insect sensor being embedded in construction materials of the building; and
 one or more processors communicatively coupled to the insect sensor, wherein the one or more processors is programmed to:
  compare a sample insect level received from the insect sensor via wireless communication to a historic baseline level stored in a memory to generate an insect level difference;
  generate, based upon the comparison, an insect alert indicating the presence of the insect infestation at the first position; and
  transmit an insect alert message to a mobile device of a user of the building monitoring computer system via wireless communication to alert the user of the presence of insects at the first position.

20. The building monitoring computer system of claim 19, wherein the insect alert message includes one or more recommendations to the user, including contact information for at least one third-party contractor located in a region of the building for addressing the detected presence of insects in the building.

* * * * *